(12) United States Patent
Ben-Shalom et al.

(10) Patent No.: US 10,859,173 B2
(45) Date of Patent: Dec. 8, 2020

(54) MULTI-CHAMBER VARIABLE PRESSURE VALVE

(71) Applicant: MEGO AFEK AC LTD., Kibbutz Afek (IL)

(72) Inventors: Nachum Ben-Shalom, Moreshet (IL); Idan Boader, Karmiel (IL); Gilad Kent, Kibbutz Ramat-David (IL); Dikla Amir, Karmiel (IL)

(73) Assignee: MEGO AFEK AC LTD., Kibbutz Afek (IL)

( * ) Notice: Subject to any disclaimer, the term of this patent is extended or adjusted under 35 U.S.C. 154(b) by 2 days.

(21) Appl. No.: 16/308,984

(22) PCT Filed: Jun. 22, 2017

(86) PCT No.: PCT/IL2017/050696
§ 371 (c)(1),
(2) Date: Dec. 11, 2018

(87) PCT Pub. No.: WO2017/221254
PCT Pub. Date: Dec. 28, 2017

(65) Prior Publication Data
US 2019/0293191 A1 Sep. 26, 2019

Related U.S. Application Data

(60) Provisional application No. 62/353,041, filed on Jun. 22, 2016.

(51) Int. Cl.
*A61H 7/00* (2006.01)
*F16K 11/22* (2006.01)
(Continued)

(52) U.S. Cl.
CPC ............ *F16K 11/22* (2013.01); *A61H 9/0078* (2013.01); *F16K 11/022* (2013.01);
(Continued)

(58) Field of Classification Search
CPC ............................... A61H 9/0078; F16K 7/17
(Continued)

(56) References Cited

U.S. PATENT DOCUMENTS 3,862,629 A   1/1975 Rotta
4,667,672 A * 5/1987 Romanowski ......... A61B 17/12
                                                128/DIG. 20
(Continued)

FOREIGN PATENT DOCUMENTS

EP    0459081      12/1991
WO    9419999       9/1994
WO    2013186397   12/2013

OTHER PUBLICATIONS

International Search Report PCT/IL2017/050696 Completed Oct. 16, 2017; dated Oct. 16, 2017 3 pages.
(Continued)

*Primary Examiner* — Robert K Arundale
(74) *Attorney, Agent, or Firm* — The Roy Gross Law Firm, LLC; Roy Gross

(57) ABSTRACT

There is provided herein, a valve for filling of at least one fluid cell of a pressure device, the valve comprising: a multiplicity of chambers; at least one elastic membrane having a varying physical property along at least one dimension thereof, the at least one elastic membrane configured to cover one or more of the multiplicity of chambers to cause varying pressure among the multiplicity of chambers; at least one membrane fluid inlet configured to provide fluid so as to apply pressure on one side of the at least one elastic membrane; at least one chamber fluid inlet configured to provide fluid to at least one of the multiplicity of chambers and apply pressure to the other side of the at least one elastic membrane; and at least one chamber fluid outlet configured
(Continued)

to allow fluid to exit from at least one of the multiplicity of chambers to at least one fluid cell of a pressure device.

12 Claims, 16 Drawing Sheets

(51) Int. Cl.
*A61H 9/00* (2006.01)
*F16K 11/02* (2006.01)
*F16K 7/17* (2006.01)
*F16K 27/02* (2006.01)

(52) U.S. Cl.
CPC ............... *A61H 2201/5005* (2013.01); *A61H 2201/5007* (2013.01); *A61H 2201/5012* (2013.01); *A61H 2201/5071* (2013.01); *F16K 7/17* (2013.01); *F16K 27/0236* (2013.01)

(58) Field of Classification Search
USPC ............... 601/149, 152; 5/711; 128/DIG. 20
See application file for complete search history.

(56) References Cited

U.S. PATENT DOCUMENTS

| | | | | |
|---|---|---|---|---|
| 4,762,121 | A * | 8/1988 | Shienfeld | A61H 9/0078 601/152 |
| 4,947,834 | A * | 8/1990 | Kartheus | A61H 9/0078 128/DIG. 20 |
| 6,254,556 | B1 * | 7/2001 | Hansen | A61H 9/0078 137/565.16 |
| 9,205,021 | B2 * | 12/2015 | Malhi | A61H 23/04 |
| 2008/0202591 | A1 | 8/2008 | Grant et al. | |
| 2015/0051518 | A1 * | 2/2015 | Zhou | A61H 23/04 601/18 |
| 2016/0238040 | A1 * | 8/2016 | Gallo | A61B 34/76 |
| 2016/0317378 | A1 * | 11/2016 | Fujishiro | A61H 9/0078 |
| 2017/0348181 | A1 * | 12/2017 | Perriard | A43B 13/189 |

OTHER PUBLICATIONS

Written Opinion of the International Searching Authority PCT/IL2017/050696 dated Oct. 16, 2017 4 pages.

* cited by examiner

MULTI-CHAMBER VARIABLE PRESSURE VALVE

RELATED APPLICATIONS

This application is a National Phase of PCT Patent Application No. PCT/IL2017/050696 having International filing date of Jun. 22, 2017, which claims the benefit of priority of U.S. Provisional Application No. 62/353,041 filed on Jun. 22, 2016. The contents of the above applications are all incorporated by reference as if fully set forth herein in their entirety.

TECHNICAL FIELD

The present disclosure relates to methods and devices for providing pneumomassage to a subject in need thereof.

BACKGROUND

It is well known to treat medical conditions such as edema with pressure devices that squeeze the limb or other body part, typically by means of inflatable pressure sleeves wrapped around the limb. The pressure device moves excess fluid from engorged tissues from distal portions of the limb to proximal portions, eventually to the trunk of the body where the fluids are absorbed in the circulatory system and excreted from the body. These pressure devices thus perform external, non-invasive compression therapy and are known as intermittent pneumatic compression devices (IPC).

Deep vein thrombosis, or deep venous thrombosis, (DVT) is the formation of a blood clot (thrombus) in a deep vein, predominantly in the legs. Common symptoms of DVT include swelling of the treated body part. A DVT can cause localized tissue damage leading to permanent disability. A DVT may become life-threatening if a piece of the blood clot breaks off, travels downstream through the heart into the pulmonary circulation system, and becomes lodged in the lung thereby causing pulmonary embolism.

Lymphedema, is a condition of localized fluid retention and tissue swelling caused by a compromised lymphatic system. Symptoms may include a feeling of heaviness or fullness, edema, and aching pain in the affected area. In advanced lymphedema, there may be the presence of skin changes such as discoloration, verrucous (wart-like) hyperplasia, hyperkeratosis, and papillomatosis; and eventually deformity (elephantiasis). Lymphedema may be inherited (primary) or caused by injury to the lymphatic vessels (secondary) or due to venous insufficiency.

Such pressure devices often include multiple pockets, typically inflatable air cells herein referred to as bladders, chambers or cells, which are successively inflated and deflated with air. This is accomplished by utilizing a valve having multiple outlets. However, there is still a need in the art for safer and more efficient pressure devices.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a compression therapy device and methods of using same, including the valve, as disclosed herein, for successive filling of fluid cells of the device.

It is understood by those skilled in the art that the present disclosure provides numerous advantages. Inter alia, the device and methods of the present disclosure enable providing pneumomassage to a subject in need thereof while providing information as to the treatment's effectiveness, and detecting possible contraindications that could appear during the course of the therapy. For example, the device and methods of the present disclosure may be particularly suitable for use in pneumatic compression therapy as prophylaxis for deep vein thrombosis (DVT), as pneumatic compression therapy is highly effective for prophylaxis of DVT, but may be contraindicated if a DVT forms during treatment. Since patients are prescribed DVT prophylaxis because they are at heightened risk for developing DVT, the development of a DVT during prophylaxis is a distinct possibility, and the ability to detect a DVT that forms during IPC therapy will provide a considerable advantage to IPC systems used as prophylaxis for this condition. As another example, the device and methods of the present disclosure may be suitable for use in the treatment of lymphedema.

There is provided, in accordance with an embodiment, a valve for successive filling of fluid cells of a compression therapy device, the valve comprising: at least two ports, each port opening to at least one fluid outlet channel, each fluid outlet channel being configured to connect to a fluid cell of a compression therapy device; an elastic membrane having a varying physical property along at least one dimension thereof, said elastic membrane configured to cover said ports to cause varying pressure among said fluid cells when fluid is injected into said fluid cells through said fluid outlet channels; at least one membrane fluid inlet configured to provide fluid so as to apply pressure on one side of said elastic membrane, thereby causing said elastic membrane to cover and block access to said ports; at least one channel fluid inlet configured to provide fluid to said fluid outlet channels, to apply pressure to other side of said elastic membrane and successively displace said elastic membrane from covering said ports, which results in successively filling of said fluid cells; and at least one fluid outlet passage configured to allow fluid to exit from said valve.

According to some embodiments, the elastic membrane may be comprised in a membrane structure designed to conform to a shape of said elastic membrane. According to some embodiments, the varying physical property of said elastic membrane may include elasticity, resiliency, stiffness, flexibility, stretchability, expandability or any combination thereof. According to some embodiments, the elastic membrane may include a depression spanning the two or more ports. According to some embodiments, the varying physical property of said elastic membrane may include a varying width of said depression along a length of said elastic membrane. According to some embodiments, the varying physical property of said elastic membrane may include a varying thickness of said depression along a length of said elastic membrane. According to some embodiments, the depression of said elastic membrane may include a narrowing width from one side to another side thereof. According to some embodiments, the depression of said elastic membrane may include notches. According to some embodiments, the depression of said elastic membrane may form a slope deepening from one side to another side thereof. According to some embodiments, the depression of said elastic membrane may include a varying geometric pattern along at least part of a perimeter thereof. According to some embodiments, the depression of said elastic membrane may include two or more compartment sections of varying sizes.

There is further provided, in accordance with an embodiment, a valve for successive filling of fluid cells of a compression therapy device, the valve comprising: at least two ports, each port opening to at least one fluid outlet channel, each fluid outlet channel being configured to connect to a fluid cell of a compression therapy device; at least two elastic membranes having at least one physical property distinguishing therebetween, each one of said at least two elastic membranes is configured to cover at least one of said ports, to cause varying pressure among said fluid cells when fluid is injected into said fluid cells; at least one membrane fluid inlet configured to provide fluid so as to apply pressure on one side of each of said at least two elastic membranes thereby causing said at least two elastic membranes to cover and block access to each of said ports; at least one channel fluid inlet configured to provide fluid to said fluid outlet channels to apply pressure to other side of each of said at least two elastic membranes and successively displace said at least two elastic membranes from covering said ports, which results in successively filling of said fluid cells; and at least one fluid outlet passage configured to allow fluid to exit from valve.

According to some embodiments, the at least one distinguishing physical property of said at least two elastic membranes may include elasticity, resiliency, stiffness, flexibility, stretchability, expandability or any combination thereof.

According to some embodiments, the at least one distinguishing physical property of said at least two elastic membranes may include width, length, thickness or any combination thereof.

There is further provided, in accordance with an embodiment, a valve for successive filling of at least two fluid cells of a pressure device, the valve comprising: at least two ports, each port opening to one or more fluid outlet channels, each fluid outlet channel being configured to connect to a fluid cell, said fluid outlet channels having different dimensions; at least one elastic membrane configured to cover one or more of said ports to define varying fluid volumes captured among said fluid cells when connected to said fluid outlet channels; at least one membrane fluid inlet configured to provide fluid so as to apply pressure on one side of said at least one elastic membrane, thereby causing said at least one elastic membrane to cover and block access to said ports; at least one channel fluid inlet configured to provide fluid to said fluid outlet channels to fill said fluid cells and apply pressure to other side of said at least one elastic membrane, successively displacing said at least one elastic membrane from covering said ports, which results in successively filling of said fluid cells; and at least one fluid outlet passage configured to allow fluid to exit said valve.

According to some embodiments, the fluid outlet channels may be separated from each other by barriers, said barriers having heights different from one another. According to some embodiments, said fluid outlet channels may have widths different from one another. According to some embodiments, the fluid outlet channels may have depths different from one another.

There is further provided, in accordance with an embodiment, a valve for successive filling of fluid cells of a compression therapy device, the valve comprising: at least two ports, each port opening to at least one fluid outlet channel, each fluid outlet channel being configured to connect to a fluid cell of a compression therapy device; at least one elastic port membrane, said at least one elastic port membrane configured to cover one or more of said ports; at least one venting aperture, opening to at least one of said fluid outlet channels; at least one elastic venting membrane, said at least one elastic venting membrane configured to cover said at least one venting aperture; at least one port membrane fluid inlet configured to provide fluid so as to apply pressure on one side of said at least one elastic port membrane thereby causing said at least one elastic port membrane to cover and block access to said ports; at least one channel fluid inlet configured to provide fluid to said fluid outlet channels to apply pressure to other side of said at least one elastic port membrane and successively displace said elastic port membrane from covering said ports as fluid is provided via channel fluid inlet, which results in successively filling of said fluid cells; at least two one-way check valves configured to allow fluid to flow from said port membrane fluid inlets into said fluid cells until fluid pressure in said fluid cells reaches a pre-determined level and closes valve, pre-determined pressure level varying among said check valves so that output pressure varies among said at least two fluid cells, each of said check valves positioned in one of said ports; and at least one fluid outlet passage configured to allow fluid to exit from valve. According to some embodiments, each of said ports may open to a set of two or more fluid outlet channels and each of said one-way check valves corresponding to one of said fluid outlet channels in said set may be configured to close at the same pressure level.

The following embodiments and aspects thereof are described and illustrated in conjunction with systems, tools and methods which are meant to be exemplary and illustrative, not limiting in scope. Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some or none of the enumerated advantages.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. It is intended that the embodiments and figures disclosed herein are to be considered illustrative rather than restrictive. The figures are listed below.

DETAILED DESCRIPTION

Figure 1A:
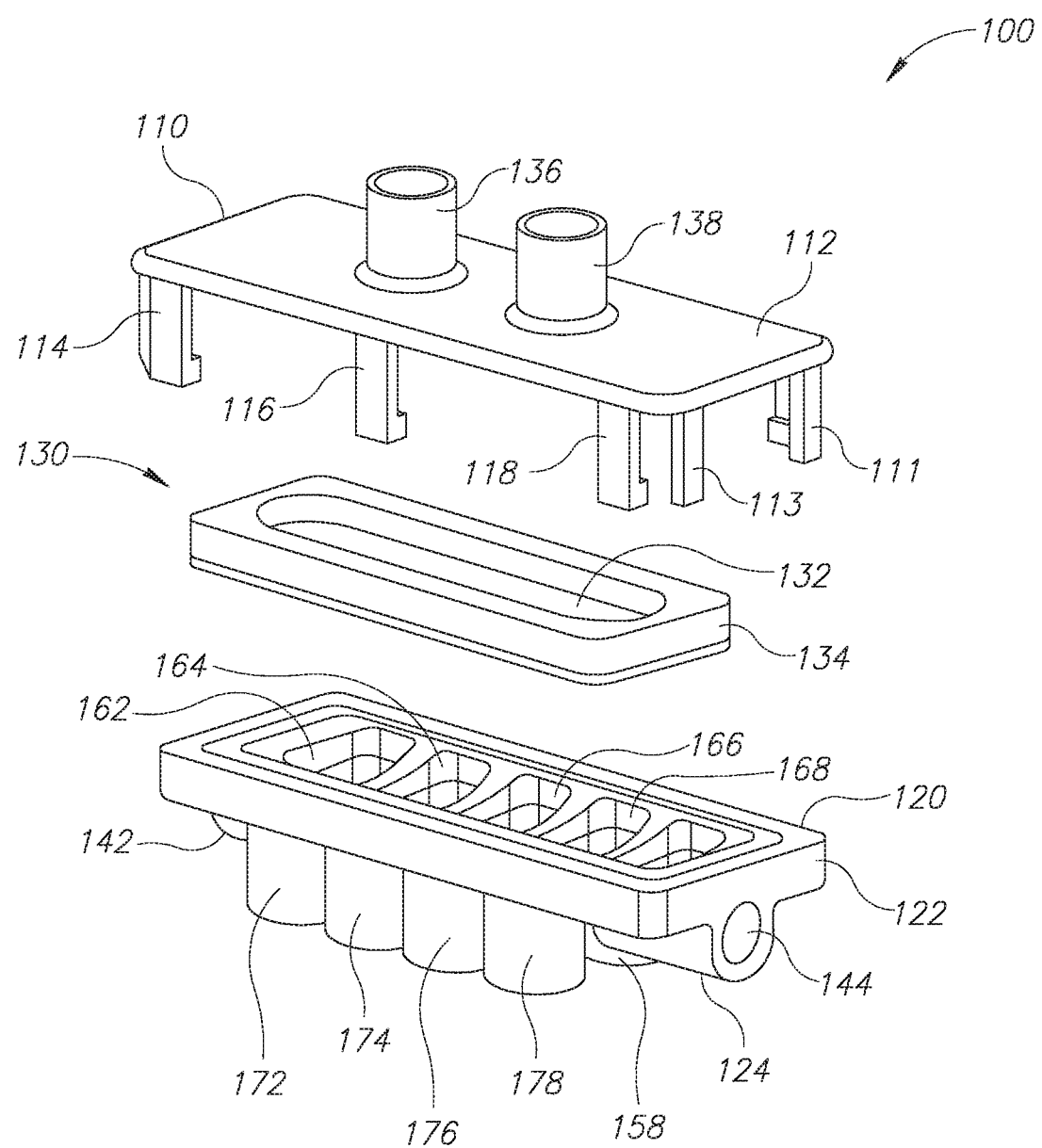
FIGS. 1A & 1B show simplified front and rear exploded views, respectively, of a multi-chamber valve, according to some embodiments of the invention.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

In the description and claims of the application, each of the words "comprise" "include" and "have", and forms thereof, are not necessarily limited to members in a list with which the words may be associated.

According to some embodiments, in the description and claims of the application, the words "chamber," "bladder" and "cell" may be used interchangeably, referring to a fluid-tight chamber for holding fluid externally attached to a valve thereof, with a port or opening into valve providing fluid access to the chamber from within the valve.

According to some embodiments, in the description and claims of the application, the word "port" when used in reference to outlet channels formed in a valve refers specifically to an opening in the valve which allows fluid access to the external chamber from within the valve, through an outlet channel in the valve.

Exemplary embodiments shown and described below comprise multiple valve ports, each port opening to two outlet channels and typically having external chambers attached to the valve at both the outlets from the pair of outlet channels. In some embodiments, valve ports may open to single outlet channels. In some embodiments, valve ports may open to more than two outlet channels. In embodiments where ports open to multiple outlet channels, chambers attached at each of the outlets of a given port are inflated at essentially the same pressure. All of these possibilities are included within the scope of this disclosure.

According to some embodiments, in the description and claims of the application it is understood that, when referring to a valve and pressure applied to or from a chamber attached thereof, the terms "downward" and "down" refer to pressure being exerted toward or into a valve port and thus through the valve outlet into the attached external chamber, and the terms "upward" or "up" refer to pressure being exerted from an external chamber outward through a valve outlet to the outlet port, regardless of the physical orientation of the valve.

According to some embodiments, in the description and claims of the application, reference may be made to "filling" of chambers. It is understood by persons of skill in the art that "filling" refers to injecting a fluid into an individual chamber externally attached to a valve thereof until the pressure builds to the level where it exceeds the downward pressure being exerted on an elastic membrane covering the chamber's associated port (opening) by fluid housed over the elastic membrane, and begins to displace the elastic membrane from covering the port. At the point when the pressure in the chamber equals the pressure over the membrane covering the chamber, the chamber is considered "filled" or fully pressurized. A chamber remains "filled" if fluid is injected after that point, increasing the pressure in the chamber further. A valve is "filled" when all externally attached chambers are pressurized.

Exemplary embodiments shown and described below comprise upper and lower housings configured to fixedly snap-fit together. In some embodiments, valve housings may be of unitary construction (i.e.; the valve housing may be formed of a single part). In some embodiments, housings may comprise two or more parts. In embodiments where valves comprise upper and lower housings, upper and lower housings may be configured to be fixedly joined together by means other than a snap-fit. These means include, but are not limited to, being welded together, being screwed together, being affixed by an adhesive such as glue and/or being fastened together by internal or external methods.

A particular feature of some embodiments of the disclosure is the capability for a valve to produce different resulting pressures for a fluid (such as air) being output from the valve and introduced into a fixed volume. As is known in the art, the pressure resulting in a fixed volume due to injection of a fluid can be affected either by changing the pressure of the input fluid or by changing the volume of fluid input. In some embodiments, the pressure output to multiple chambers attached to a valve may be varied. In some embodiments, the volume of fluid output to the multiple chambers may be varied. In some embodiments, both the fluid pressure and the volume of fluid output to the multiple chambers may be varied.

Embodiments of the disclosure relate to a valve for successive filling up of individual chambers externally attached to a valve with a fluid to be output at different pressures and/or volumes. The valve comprises outlet channels and outlet ports, with one or more elastic membranes for the covering of chambers, wherein a control pressure acts on each elastic membrane on the side remote from the outlet ports, at least one exhaust passage is provided, with the pressure control membrane connected to an inlet conduit as well as an adjacent orifice, the valve allowing different pressures or volumes to be output at each outlet. The valve is used for inflating connected chambers to different pressures and/or volumes in a given sequence and then deflating them. One or more of the chambers may be deflated through an outlet port or multiple outlet ports before the remainder of the chambers are deflated.

A capability for outputting different pressures and/or volumes of fluids, or creating a differential gradient pressure, is safer and potentially more beneficial for the subject being treated by IPC. This technique greatly reduces the risk of pushing body fluids such as blood and lympha up the blood stream. According to some embodiments, there are provided herein pneumatic compression devices and methods for creating a differential gradient pressure, while inflating the cells of the compression sleeve around the treated area.

Figure 1B:
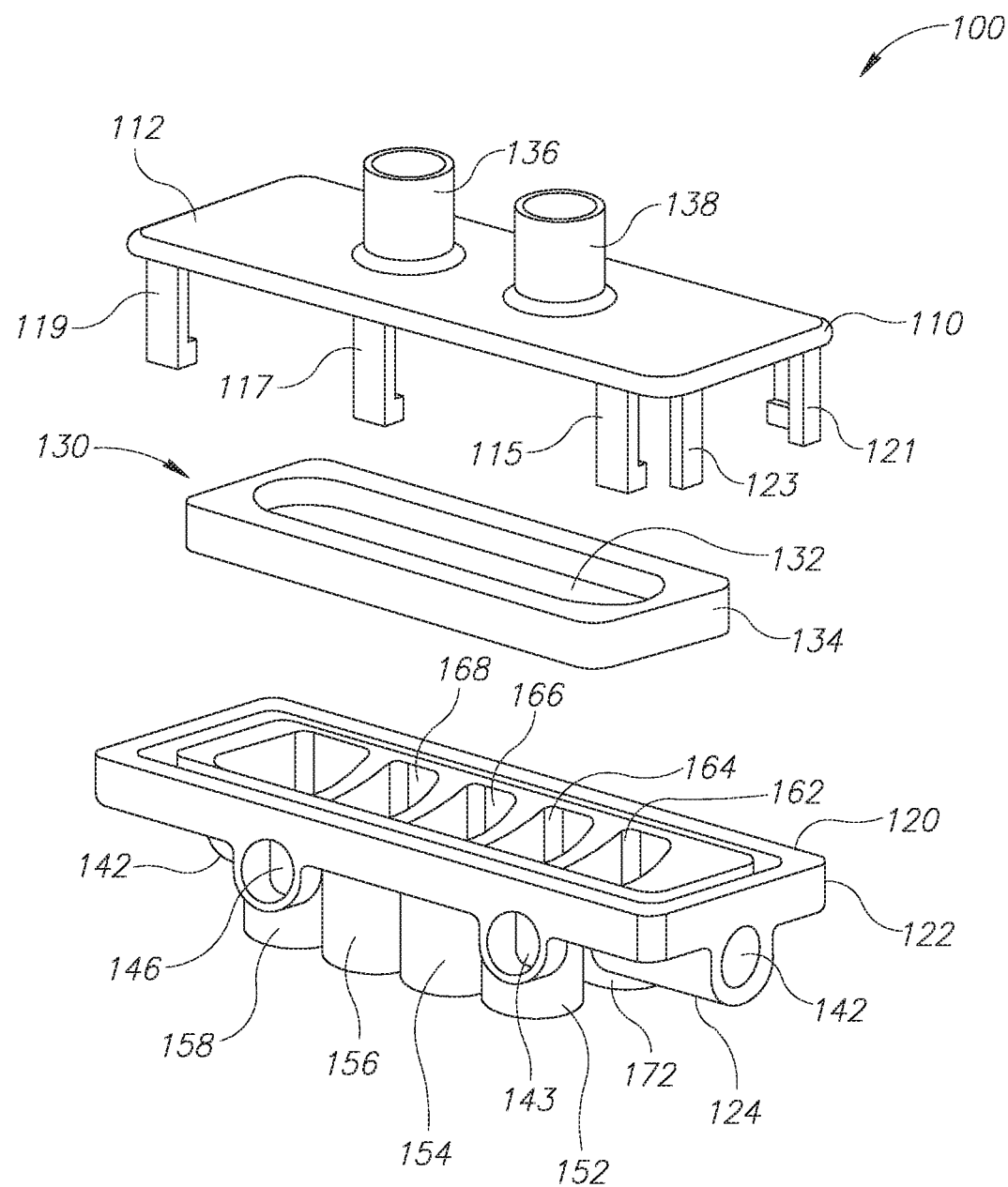

Reference is now made to FIGS. 1A & 1B, which show simplified front and rear exploded views, respectively, of a multi-chamber valve, according to some embodiments of the invention. Valve 100 comprises upper and lower housings 110 and 120 which are configured to fixedly snap-fit when pressed together. In some embodiments, valve 100 may comprise a single part; in others, valve 100 may comprise two or more housing portions. In embodiments with valves comprising two or more portions, engagement mechanisms for fixedly joining housings together, other than a snap-fit arrangement, are possible. These means include, but are not limited to, welding, being screwed together, being affixed by an adhesive such as glue, being fastened together by internal or external methods, or any combination of methods.

Exemplary elastic membrane structure 130 is configured to fit within the closed valve housing, and comprises a membrane 132 with a stadium-shaped depression formed within a membrane frame 134 having a substantially rectangular outer cross-section.

Upper housing 110 is table-like, having a flat outward-facing surface 112 and a multiplicity of leg brackets. In the embodiment depicted in FIGS. 1A & 1B, for example, there are ten leg brackets, although not all can be seen. As depicted, there are three leg brackets on front and back (longer sides) of upper housing 110, for example exemplary leg brackets 114, 116 and 118 on front of upper housing 110 and leg brackets 115, 117 and 119 on back of upper housing 110, and two leg brackets on both the ends (shorter sides) of upper housing 110, for example exemplary leg brackets 111 and 113 on right side of upper housing 110 and leg brackets 121 and 123 on left side of upper housing 110. In some embodiments, upper housing 110 may comprise more leg brackets than shown; in some embodiments, upper housing 110 may comprise fewer leg brackets than shown. In some embodiments, leg brackets may have a spatial arrangement about upper housing 110 other than the arrangement shown in FIGS. 1A & 1B and/or have fewer or more leg brackets. Leg brackets 111, 113, 114, 115, 116, 117, 118, 119, 121 and 123 are configured for snap-fit engagement with the exterior of lower housing 120.

Integrally formed facing outward on flat outward-facing surface 112 of upper housing 110 are two hollow cylindrical protrusions, a first fluid (membrane) inlet 136 and a sensor outlet 138. First fluid inlet 136 may be connected to one or more external fluid source (not shown) while sensor outlet 138 may be connected to an external pressure monitoring and regulation system (not shown; refer to FIG. 10).

Lower housing 120 comprises upper and lower portions 122 and 124. Upper portion 122 comprises an outer surface having a substantially rectangular cross-section. Lower portion 124 comprises a multiplicity of fluid outlets, at least one inlet and at least one exhaust outlet, as will be described hereinbelow. As shown particularly in FIG. 1B, lower housing 120 has a second (channel) fluid inlet 142 bored into one side of lower portion 124 and, as shown particularly in FIG. 1A, an exhaust channel 144 bored into the opposite side. As shown particularly in FIG. 1B, third fluid inlet (channel) 143 and sensor outlet 146 are bored into rear side of lower portion 124. Third fluid inlet 143 is connected with second fluid inlet 142, internal to the valve (not visible).

Lower portion 124 comprises a multiplicity of fluid outlets. In the exemplary embodiment shown, there are eight outlet channels 152, 154, 156 158, 172, 174, 176 and 178, having partially cylindrical outward surfaces. Four outlet channels 172, 174, 176 and 178 are on the front of lower portion 124 (FIG. 1A) and four outlet channels 152, 154, 156 and 158 are on the rear of lower portion 124 (FIG. 1B). Upper portion 122 of lower housing 120 also comprises outlet ports 162, 164, 166 and 168 corresponding, respectively, to pairs of outlet channels 152 and 172, 154 and 174, 156 and 176 and 158 and 178, respectively, providing access for filling eight fluid-tight external chambers (not shown) with fluid, via outlet channel pairs 152 and 172, 154 and 174, 156 and 176 and 158 and 178. Each outlet port thus provides access for filling a pair of externally attached chambers via a pair of outlet channels to which the port provides an opening.

Second and third fluid inlets 142 and 143 open into outlet channel pair 152 and 172 while exhaust channel 144 opens into outlet channel pair 158 and 178 (not visible in FIGS. 1A or 1B; refer to FIGS. 11A-11G). When upper and lower housing 110 and 120 are fixedly snap-fit together, enclosing the elastic membrane structure 130, elastic membrane structure 130 may rest over outlet ports 162, 164, 166 and 168.

As described in more detail below, particularly with reference to FIGS. 11A-11G, one or more external fluid source (not shown) may be connected to first (membrane) fluid inlet 136 in upper housing 110, and fluid may be injected into first fluid inlet 136. Fluid flowing from inlet 136 pressurizes the space above elastic membrane structure 130 (remote from outlet channels 152, 154, 156 158, 172, 174, 176 and 178) and creates downward force on elastic membrane structure 130, which is caused to cover outlet ports 162, 164, 166 and 168 and close off access to outlet channels 154, 156 158, 174, 176 and 178 from within the valve when the downward pressure is great enough. (Access to outlet channel pair 152 and 172 is not closed off because of direct access from second and third inlets 142 and 143, as described above.) One or more external fluid source may continue to inject fluid into first fluid inlet 136 until external pressure sensor (not shown), connected to sensor outlet 138, detects that the pressure above the elastic membrane structure 130 has reached a pre-determined level.

One or more external fluid source (not shown) may inject fluid into second and/or third fluid inlets 142 and 143 so that fluid flows into outlet port 162, feeding fluid to a pair of externally attached chambers (not shown) via outlet channels 152 and 172, through opening from second and third fluid inlets 142 and 143, described above. When external chambers attached at outlet channels 152 and 172 are filled, continued injection of fluid into second and/or third fluid inlets 142 and 143 exerts upward pressure on, and displaces upward, elastic membrane structure 130. This opens access to port 164 so that fluid then flows into chamber port 164 through outlet channels 154 and 174 into a pair of attached external chambers (not shown). Chambers attached to outlet channels 154 and 174 then become filled as fluid continues to be injected into second and/or third fluid inlets 142 and 143 and pass into port 164. This process continues in like fashion until external chambers (not shown) attached at outlet channel pairs 156 and 176 and 158 and 178 are also filled, in succession.

Continued injection of fluid into second and/or third fluid inlets 142 and 143 after external chambers attached at outlet channels 152, 154, 156 158, 172, 174, 176 and 178 are filled causes pressure to build inside each of the external chambers attached to the valve, as well as within the valve itself. This increased pressure is detected by the pressure sensor attached to sensor outlet 146, and the controller is notified. When the pressure reaches a pre-defined pressure level, the controller sends a signal instructing the one or more fluid source to cease injecting fluid. In some cases, the injection of fluid may be halted immediately upon such notice. In other cases, the fluid source(s) may continue injecting fluid for a pre-determined amount of time.

Fluid pressure above elastic membrane structure 130 begins to ease once fluid injection into upper housing 110 ceases. As the fluid pressure above elastic membrane structure 130 eases, elastic membrane structure 130 is pushed upward further via the fluid pressure in the external chambers connected at outlet channels 152, 154, 156 158, 172, 174, 176 and 178, below elastic membrane structure 130. This allows fluid to be evacuated from the external chambers connected to outlet channels 152, 154, 156 158, 172, 174, 176 and 178 through chamber ports 162, 164, 166 and 168 and into exhaust channel 144 as an entry from outlet port 168 into exhaust channel 144 is created by the lifting of elastic membrane structure 130. All external chambers are deflated as the fluid is evacuated from them.

In some situations, it may be desirable to fill fewer than the maximum possible number of external chambers. In such cases, a subset of the full set of available valve outlet channels, corresponding to the number of external chambers to be filled, may be used. This may be accomplished by blocking or plugging one or more of the valve outlet channels. (This subset must include at least one outlet channel; that is, all but one outlet channel may be blocked.) These situations may include, but are not limited to, cases where the subject is a child, cases where the subject is a senior, cases where one chamber has been placed near a wound or tumor (it is desirable not to apply pressure at the wound or tumor site) and cases where the subject has low body weight.

Figure 2A:
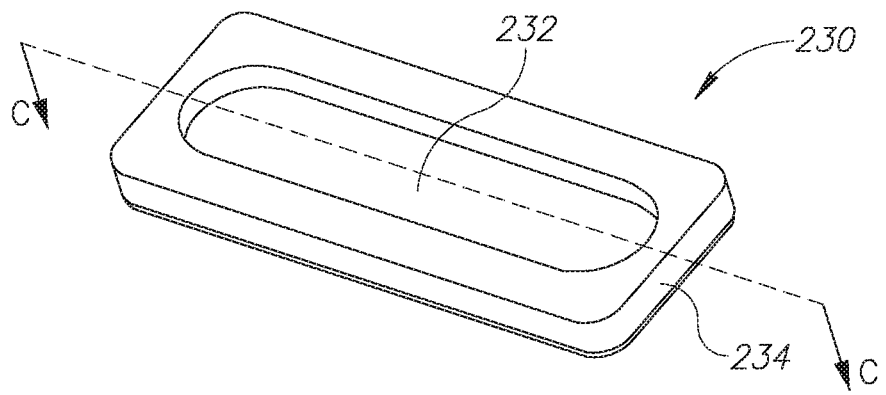
FIGS. 2A, 2B & 2C show simplified perspective, top and side-sectional views, respectively, the side-sectional view taken along line C-C of FIG. 2A, of an elastic membrane structure for a multi-chamber valve, according to some embodiments of the invention.
Figure 2B:
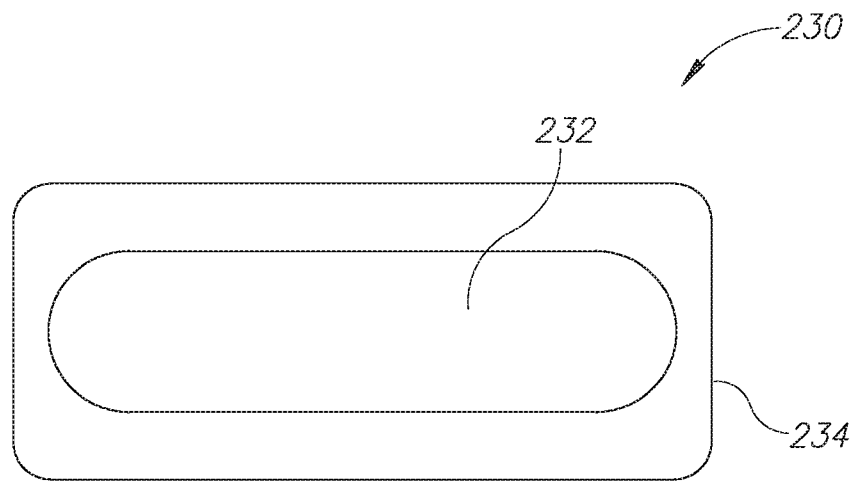
Figure 2C:
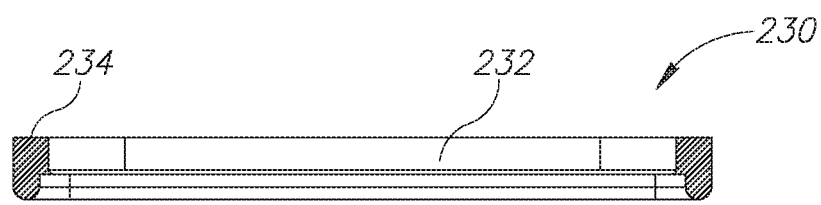

Reference is now made to FIGS. 2A, 2B & 2C, which show simplified perspective, top and side-sectional views, respectively, the side-sectional view taken along line C-C of FIG. 2A, of an elastic membrane structure for a multi-chamber valve, according to some embodiments of the invention. Elastic membrane structure 230 comprises a membrane 232 with a stadium-shaped depression formed within a membrane frame 234 having a substantially rectangular cross-section. As shown in FIGS. 3A-4C, 6 and 9A, embodiments of the invention may comprise elastic membranes significantly different from the one shown here in FIGS. 2A-2C.

Depression in membrane 232 has substantially constant width (see FIG. 2B) and depth (see FIG. 2C) and no variations in physical properties. Using a membrane with substantially constant width and depth and no variations in physical properties results in substantially equal pressure in all valve chambers when they are successively filled, as described below. As is seen below in FIGS. 3A-4C, 6 and 9A, various embodiments of the invention may comprise elastic membrane structures significantly different from the one shown here. As described hereinbelow, such variations in the width, depth and physical properties of the elastic membrane(s) may result in differing pressures among the chambers.

Figure 3A:
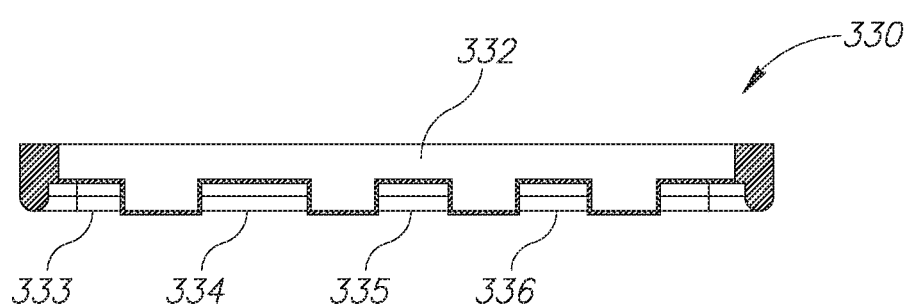
FIGS. 3A & 3B show simplified side-sectional views, similar to the view in FIG. 2C, of elastic membrane structures for a multi-chamber valve whose thickness is varied in a geometric pattern and a graduated pattern, respectively, according to some embodiments of the invention.
Figure 3B:
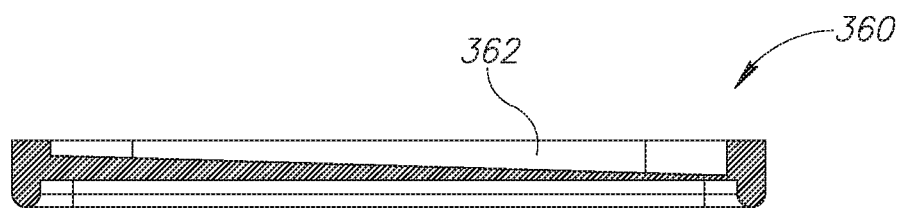

Reference is now made to FIGS. 3A & 3B, which show simplified side-sectional views, similar to the view in FIG. 2C, of elastic membrane structures for a multi-chamber valve whose thickness is varied in a geometric pattern and a graduated pattern, respectively, according to some embodiments of the invention.

Referring particularly to FIG. 3A, elastic membrane structure 330 is formed with rectangular notches in the depression 332. The distances between the notches are varied so that the chamber covers 333, 334, 335 and 336 are different widths. Varying the widths of chamber covers 333, 334, 335 and 336 causes the average thickness of the membrane to vary along the membrane's length and thus the average thickness of the membrane portions covering the various outlet ports varies. The greater the average thickness of the membrane covering an outlet port, the lower the force, and thus the lower the pressure that will be needed to displace the membrane from the port.

Referring now to FIG. 3B, elastic membrane structure 360 is formed with bottom of depression 362 sloped, deepening from left to right as shown. As the space between elastic membrane structure 360 and the upper valve housing is filled wih fluid, the force exerted on the membrane portions above the outlet ports by the fluid pressure above the membrane increases from left to right, because the thickness of the membrane decreases from left to right.

As described hereinbelow, when one or more elastic membrane rests within a valve housing atop a multiplicity of outlet ports externally attached to chambers, fluid may be injected into a space above the membrane, remote from the ports, forcing the membrane downward to cover and close off access of the ports to the chambers. As fluid is then injected into the chambers, below the membrane, the membrane is successively displaced from the ports, allowing the chambers to be successively filled with the fluid (refer to FIGS. 11A-11G). When the thickness of the membrane above the chambers varies, the upward force needed to displace it from the chamber ports also varies. Thus, the pressure needed to "fill" the chambers varies and the output pressure will vary accordingly, between chamber pairs.

It is understood by those skilled in the art that FIGS. 3A & 3B are exemplary embodiments, that other modifications or permutations that vary the thickness of the membrane over the multiplicity of valve chambers may be made, and the invention includes all such modifications or permutations.

Figure 4A:
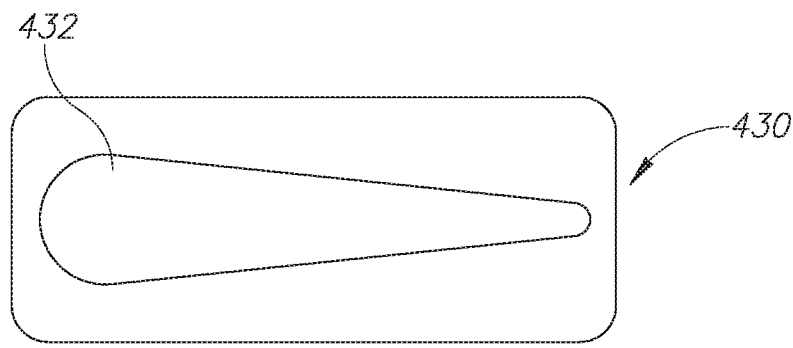
FIGS. 4A, 4B & 4C show simplified top views, similar to the view in FIG. 2B, of elastic membrane structures for a multi-chamber valve whose widths are varied in a graduated pattern and two geometric patterns, respectively, according to some embodiments of the invention.
Figure 4B:
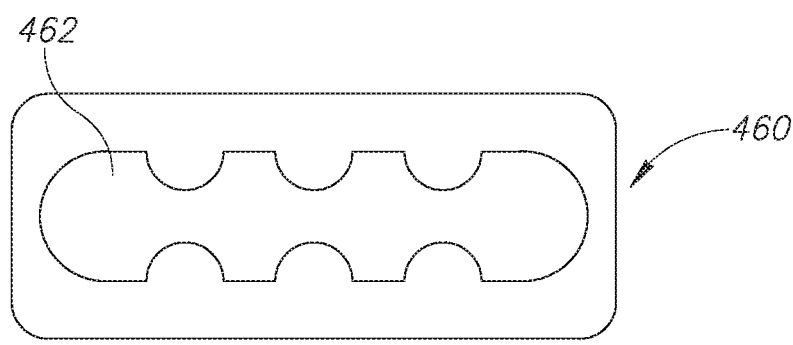
Figure 4C:
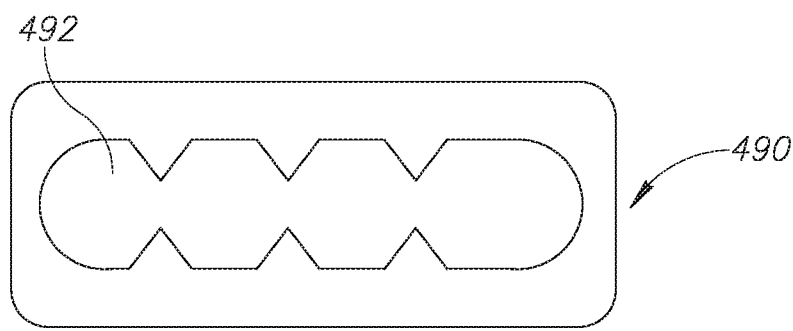

Reference is now made to FIGS. 4A, 4B & 4C, which are simplified top views of elastic membrane structures for a multi-chamber valve whose widths are varied in a graduated pattern and two geometric patterns, respectively, according to some embodiments of the invention.

Referring particularly to FIG. 4A, elastic membrane structure 430 comprises an elastic membrane 432 formed with depression having a substantially cone-like shape, narrowing from left to right as shown. As described hereinbelow, elastic membrane structure 430 may be placed within a valve atop a multitude of fluid outlet ports, each externally connected to a fluid chamber. As the space between elastic membrane structure 430 and the upper valve housing is filled with fluid and the membrane is forced downward to cover access to the chambers via the outlet ports, the average thickness of the membrane covering the chambers increases from left to right. As the chambers are filled, the amount of pressure in each chamber needed to displace the membrane above it will thus decrease from left to right.

Referring now to FIG. 4B, elastic membrane structure 460 is formed with circular notches in the sides of depression 462. The distances between the notches are varied so that the average thickness of the membrane covering the outlet ports differs and thus different pressures are exerted on the portions of the membrane covering ports to the associated chambers, when fluid is injected into the space between elastic membrane structure 460 and the upper valve housing. As the chambers are subsequently filled with fluid, the amount of pressure in each chamber needed to displace the membrane above it will thus differ.

Referring now to FIG. 4C, elastic membrane structure 490 is formed with triangular notches in the sides of depression 492. The distances between the notches are varied so that the average thickness of the membrane covering the outlet ports differs and thus different pressures are exerted on the portions of the membrane covering ports to the associated chambers, when fluid is injected into the space between elastic membrane structure 490 and the upper valve housing. As the chambers are subsequently filled with fluid, the amount of pressure in each chamber needed to displace the membrane above it will thus differ.

As described hereinbelow, when one or more elastic membrane rests within a valve housing atop a multiplicity of fluid outlet ports, each externally connected to a fluid chamber, fluid may be injected into a space above the membrane, remote from the ports, forcing the membrane downward to cover and close off access of the ports to the chambers. As fluid is then injected into the chambers via the ports, below the membrane, the membrane is successively displaced from the outlet ports, allowing the chambers to be successively filled with the fluid (refer to FIGS. 11A-11G). When the width of the membrane above the chambers varies 13 and thus the average thickness of the membrane varies, the upward force needed to displace it from the chamber ports also varies. Thus, the pressure needed to "fill" the chambers varies, and the output pressure will vary accordingly, between chamber pairs.

It is understood by those skilled in the art that FIGS. 4A, 4B & 4C are exemplary embodiments, that other modifications or permutations that vary the width of the membrane over the multiplicity of valve chambers may be made, and the invention includes all such modifications or permutations.

It is further understood by those skilled in the art that other modifications or permutations that vary both the thickness and the width of the membrane over the multiplicity of valve chambers may be made and the invention includes all such modifications or permutations.

Figure 5:
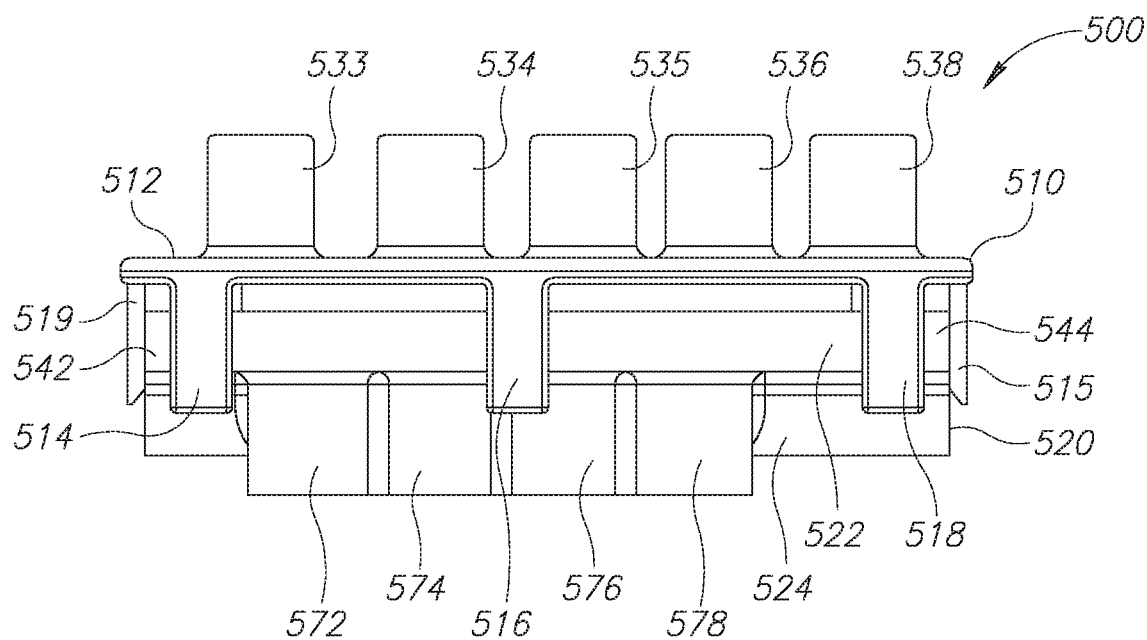
FIG. 5 shows a simplified perspective view of a multi-chamber valve with multiple fluid inlets to the elastic membrane, according to some embodiments of the invention.

Reference is now made to FIG. 5, which is a simplified perspective view of a multi-chamber valve with multiple fluid inlets to the elastic membrane, according to some embodiments of the invention. Valve 500 comprises an upper and a lower housing 510 and 520 which are configured to fixedly snap-fit when pressed together, as shown in FIG. 5, or are otherwise held together. In some embodiments, a valve may comprise a single part; in others, valve 500 may comprise two or more housing portions. In embodiments with valves comprising two or more portions, engagement mechanisms for fixedly joining housing together other than a snap-fit arrangement are possible. These means include, but are not limited to, welding, being screwed together, being affixed by an adhesive such as glue and/or being fastened together by internal or external methods.

Upper housing 510 is table-like, having a flat outward-facing surface 512 and a multiplicity of leg brackets. In the embodiment depicted in FIG. 5, for example, there are ten leg brackets, although not all can be seen. As depicted, there are three leg brackets on both longer sides of upper housing 110, for example exemplary leg brackets 514, 516 and 518 on front of upper housing 110. On both shorter sides of upper housing 110, there are two leg brackets, although only one per side is visible in FIG. 5. These exemplary leg brackets are labelled 515 and 519. In some embodiments, upper housing 510 may comprise more leg brackets than shown; in some embodiments, upper housing 510 may comprise fewer leg brackets than shown. In some embodiments, leg brackets may have a spatial arrangement about upper housing 510 other than the arrangement shown in FIG. 5 and/or have fewer or more leg brackets. Leg brackets 514, 516, 518, 515 and 519, along with other, non-visible leg brackets of the upper housing 510, are configured for snap-fit engagement with the exterior of lower housing 520.

Integrally formed facing outward on flat outward-facing surface 512 of upper housing 510 are at least three hollow cylindrical protrusions. In the exemplary embodiment shown in FIG. 5, there are five such protrusions, first, second, third and fourth fluid (membrane) inlets 533, 534, 535 and 536 and a sensor outlet 538. Fluid inlets 533, 534, 535 and 536 may be connected to one or more external fluid sources while sensor outlet 538 may be connected to an external pressure monitoring and regulation system (see FIG. 10).

Lower housing 520 comprises upper and lower portions 522 and 524. Upper portion 522 comprises an outer surface having a substantially rectangular cross-section. Lower portion 524 comprises at least two chambers, at least one inlet and at least one outlet. Exemplary lower housing 520 has a fifth fluid (channel) inlet 542 bored into one side of lower portion 524 and an exhaust channel 544 bored into the opposite side. A Sixth fluid inlet (channel) 543 and sensor outlet 546 are bored into rear side of lower portion 524 (not seen in FIG. 5.)

Lower portion 524 also comprises at least two fluid outlets with partially cylindrical outward-facing surfaces. In the exemplary embodiment shown, there are eight outlet channels 552, 554, 556, 558, 572, 574, 576 and 578. Outlet channels 552, 554, 556 and 558 are located on the rear of the valve and are thus not visible in FIG. 5. Upper portion 522 of lower housing 520 also comprises outlet ports 562, 564, 566 and 568 (not seen in FIG. 5) corresponding, respectively, to outlet channel pairs 552 and 572, 554 and 574, 556 and 576 and 558 and 578, similar to lower housing 120 shown in FIGS. 1A & 1B. Outlet ports 562, 564, 566 and 568 provide access for filling external chambers, attached to outlet channel pairs 552 and 572, 554 and 574, 556 and 576 and 558 and 578, respectively, with fluid. Each outlet port provides access for filling a pair of externally attached chambers via a pair of outlet channels to which the port provides an opening. Fifth fluid inlet 542 opens into outlet channel pair 552 and 572 while exhaust channel 544 opens into outlet channel pair 558 and 578 (these cannot be seen in FIG. 5; refer to FIGS. 11A-11G).

Figure 6:
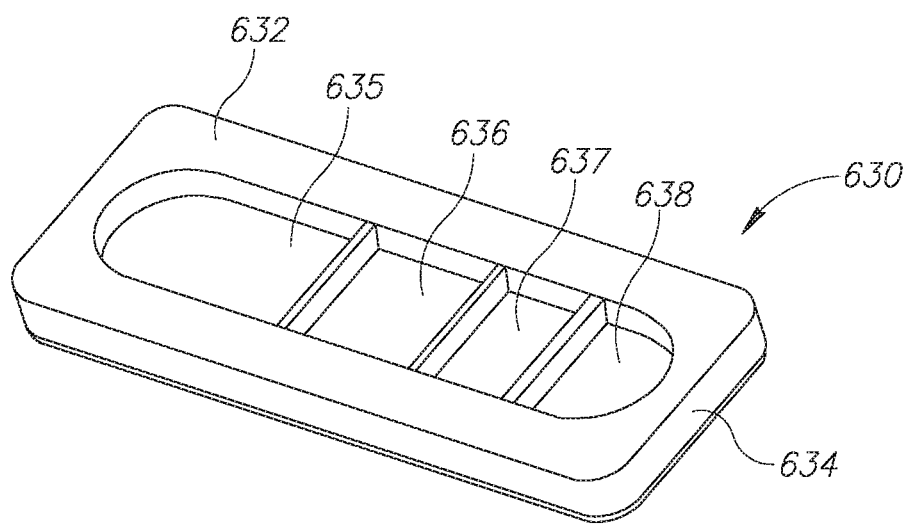
FIG. 6 shows a simplified perspective view of a multi-sectional elastic membrane structure for a multi-chamber valve, according to some embodiments of the invention.

When the upper and lower housing 510 and 520 are fixedly snap-fit together as shown, enclosing the (unseen) elastic membrane structure 630 (as seen in FIG. 6), elastic membrane structure 630 may rest over outlet ports 562, 564, 566 and 568. An elastic membrane structure for multi-inlet embodiments may have at least two sections, the number of sections corresponding to the number of outlet ports in the valve. Exemplary elastic membrane structure 630, shown in FIG. 6, is divided into four different size sections, one designed to cover each of outlet ports 562, 564, 566 and 568, respectively.

As described hereinbelow, each of fluid inlets 533, 534, 535 and 536 may have fluid injected via one or more external fluid sources (not shown), filling the respective sections of elastic membrane structure 630 corresponding to outlet ports 562, 564, 566 and 568, remote from them. Because the sections of elastic membrane structure 630 are different sizes, different volumes of fluid fill them and result in different forces being exerted downward over the four outlet ports 562, 564, 566 and 568.

As fluid is then injected into the chambers, via the outlet ports beneath the membrane, the membrane is successively displaced from the outlet ports, allowing the chambers to be successively filled, in pairs, with the fluid (refer to FIGS. 11A-11G). When the volume of the fluid above the membrane varies across ports, the upward force needed to displace it from the ports also varies accordingly. Thus, the pressure needed to "fill" the chambers varies, and the output pressure will vary accordingly, between pairs of chambers.

Reference is now made to FIG. 6, which is a simplified perspective view of a multi-sectional elastic membrane structure for a multi-chamber valve, according to some embodiments of the invention. Multi-sectional elastic membrane structures may be formed with at least two sections, separated by vertical barriers formed within the membrane's generally stadium-shaped depression. Exemplary elastic membrane structure 630 is configured to fit within the closed valve housing, and comprises a membrane 632 with a stadium-shaped depression formed within a membrane frame 634 having a substantially rectangular outer cross-section. Formed within the depression are three vertical barriers, spaced so as to create four different size membrane sections (pockets/compartments) 635, 636, 637 and 638 corresponding to a valve with four outlet ports. Each one of membrane sections (pockets/compartments) 635, 636, 637 and 638 is designed to cover a corresponding outlet port. Elastic membrane structure 630 may be used in conjunction with a multi-chamber valve with multiple fluid inlets such as the one depicted in FIG. 5. In such embodiments, the multiplicity of membrane cover sections are filled individually through each of the corresponding fluid inlets. As the chambers below elastic membrane structure 630 are filled, the amount of pressure in each chamber needed to displace the membrane above it will differ and thus the output pressure will vary accordingly, between chamber pairs.

Figure 7:
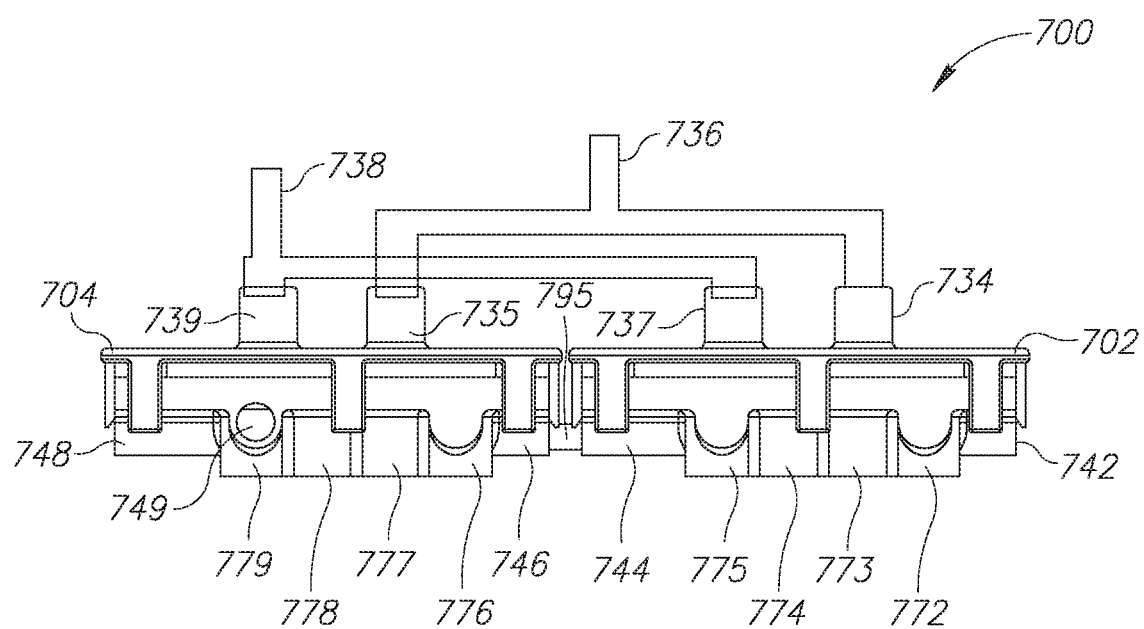
FIG. 7 shows a simplified front view of a multi-valve system, according to some embodiments of the invention.

Reference is now made to FIG. 7, which is a simplified front view of a multi-valve system, according to some embodiments of the invention. A multi-valve system may be constructed of a multiplicity of valves. As shown in FIG. 7, exemplary multi-valve system 700 comprises two valves 702 and 704. Internal to valves 702 and 704 are elastic membranes 732 and 733, respectively (not seen). Joint fluid inlet 736 may be connected to one or more external fluid source (not shown) and feeds both fluid (membrane) inlets 734 and 735 formed integrally, respectively, on valves 702 and 704. Joint sensor outlet 738 may be connected to an external pressure monitoring and regulation system (not shown) such as the one shown in FIG. 10, and also connects to both sensor outlets 737 and 739 formed integrally, respectively, on valves 702 and 704. An external pressure monitoring and regulation system may also be connected to sensor outlet 749 in valve 704.

One or more external fluid source is also connected to second fluid (channel) inlet 742 which feeds into outlet channel pairs 752 and 772, 753 and 773, 754 and 774 and 755 and 775 in valve 702 via outlet ports 762, 763, 764 and 765, respectively (not seen in FIG. 7). Outlet channels 752, 753, 754 and 755 are on the rear side of the valve and are not visible in FIG. 7. Each of outlet channels 752, 753, 754, 755, 772, 773, 774 and 775 may be connected to external chambers (not shown). Each outlet port provides access for filling a pair of externally attached chambers via a pair of outlet channels to which the port provides an opening.

Exhaust channel 744 in valve 702 is linked to second fluid inlet 746 in valve 704 by connector 795. Connector 795 may be a pipe or other suitable conduit to allow fluid to pass between valves 702 and 704. Second fluid inlet 746 feeds into outlet channel pairs 756 and 776, 757 and 777, 758 and 778 and 759 and 779 in valve 704 via outlet ports 766, 767, 768 and 769, respectively (not seen in FIG. 7). Outlet channels 756, 757, 758 and 759 are on the rear side of the valve and are not visible in FIG. 7. Each of outlet channels 756, 757, 758, 759, 776, 777, 778 and 779 may be connected to external chambers (not shown). Each outlet port provides access for filling a pair of externally attached chambers via a pair of outlet channels to which the port provides an opening.

Outlet ports 762, 763, 764 and 765 in valve 702 are covered by elastic membrane 732 while outlet ports 766, 767, 768 and 769 in valve 704 are covered by elastic membrane 733. In multi-valve embodiments, chambers attached to a first valve are filled before chambers attached to a second valve, and so on until the last valve in the series is filled. In the exemplary embodiment having two valves 702 and 704, chambers attached to outlet channel pairs 752 and 772, 753 and 773, 754 and 774 and 755 and 775 in valve 702 are filled succesively, in pairs, before chambers attached to outlet channel pairs 756 and 776, 757 and 777, 758 and 778 and 759 and 779 in valve 704 are then, in turn, filled succesively, in pairs. In this exemplary multi-valve embodiment, sixteen chambers—eight per valve—may be pressurized.

One or more external fluid source may be connected to joint fluid inlet 736 and the spaces above elastic membranes 732 and 733 may be filled with fluid, creating downward pressure on elastic membranes 732 and 733, which are caused to cover outlet ports 762, 763, 764, and 765 of valve 702 and outlet ports 766, 767, 768, and 769 of valve 704 and close off access to chambers attached to outlet channel pairs 753 and 773, 754 and 774 and 755 and 775 of valve 702 and chambers attached to outlet channel pairs 757 and 777, 758 and 778 and 759 and 779 of valve 704. (Access to outlet channel pairs 752 and 772 and 756 and 776 is not closed off because of direct access from second inlets 742 and 746, respectively, as described above.) One or more external fluid source connected to inlet channel 742 injects fluid which flows into outlet channel pair 752 and 772 via outlet port 762 through the opening described above. When chambers attached to outlet channels 752 and 772 are filled, continuing to inject fluid into second fluid inlet 742 exerts upward pressure on, and displaces upward, elastic membrane 732 opening access to port 763 so that fluid then flows into port 763 through outlet channel pair 753 and 773 into attached chambers. Chambers attached to outlet channels 753 and 773 then become filled as fluid continues to be injected into second fluid inlet 742. This process continues in like fashion until chambers attached to outlet channel pairs 754 and 774 and 755 and 775 are also filled, in succession.

Continued injection of fluid into second fluid inlet 742 after chambers attached to outlet channels 752, 753, 754, 755, 772, 773, 774 and 775 are filled displaces the elastic membrane upward further, allowing fluid to exit outlet 744 of valve 702 and enter second inlet 746 of valve 704, via connector 795.

As fluid continues to be injected into second fluid inlet 742 of valve 702, fluid flows into outlet channel pair 756 and 776 via outlet port 766 from second inlet 746. When chambers attached to outlet channels 756 and 776 are filled, continuing to inject fluid into second fluid inlet 742 exerts upward pressure on, and displaces upward, elastic membrane 733 of valve 704 enough to open access to port 767 so that fluid then flows into outlet channel pair 757 and 777 via outlet port 767 into the pair of attached chambers. Chambers attached to outlet channels 757 and 777 then become filled as fluid continues to be injected into second fluid inlet 742, flowing into valve 704 from valve 702 via connector 795. This process continues in like fashion until chambers attached to outlet channel pairs 758 and 778 and 759 and 779 are also filled, in succession.

Continued injection of fluid into second fluid inlet 742 causes pressure to build inside each of the chambers attached to outlet channel pairs 752 and 772, 753 and 773, 754 and 774 and 755 and 775 of valve 702, as well as chambers attached to outlet channel pairs 756 and 776, 757 and 777, 758 and 778 and 759 and 779 of valve 704. This increased pressure is detected by the pressure sensor attached to sensor outlet 748 and the controller is notified. When the pressure reaches a pre-defined pressure level, the controller sends a signal instructing the one or more fluid source to cease injecting fluid. In some cases, the injection of fluid may be halted immediately upon such notice. In other cases, the one or more fluid source may continue injecting fluid for a pre-determined amount of time.

Fluid pressure above elastic membranes 732 and 733 begins to ease once fluid injection into the upper housings of the valves ceases. As the pressure in the space above elastic membrane 733 continues to ease and elastic membrane 733 is pushed upward further via the pressure in the chambers attached to outlet channels 752, 753, 754, 755, 756, 757, 758, 759, 772, 773, 774, 775, 776, 777, 778 and 779. This allows fluid to flow from and be evacuated from chambers attached to outlet channels 752, 753, 754, 755, 756, 757, 758, 759, 772, 773, 774, 775, 776, 777, 778 and 779 through chamber ports 762, 763, 764, 765, 766, 767, 768 and 769 and into exhaust channel 748 as an entry from outlet port 769 of outlet channel 779 into exhaust channel 748 is created by the lifting of elastic membrane 733. Chambers attached to outlet channels 752, 753, 754, 755, 756, 757, 758, 759, 772, 773, 774, 775, 776, 777, 778 and 779 are deflated as the fluid is evacuated from them.

Elastic membranes 732 and 733 may resemble those of any of the embodiments described herein (for example, see FIGS. 2A-4C, 6 and 9A) or may be any other membrane whose width, thickness and/or physical properties are varied across their lengths. Elastic membranes 732 and 733 may be identical or may be different. As described herein, varying the width, thickness and/or physical properties of membranes may cause the resultant pressures in the chambers attached to the outlet ports they cover to vary and thus the output pressure will vary accordingly, between chamber pairs.

Valves making up a multi-valve system such as described above may be identical or different. For example, some or all may be valves such as the embodiments described with reference to FIGS. 1A & 1B while some or all may be valves such as the embodiments described hereinbelow with reference to FIGS. 8A & 8B. It is understood that the valves that comprise a multi-valve system may be selected from any of the individual valves of the various embodiments of the disclosure, shown and not shown.

Figure 8A:
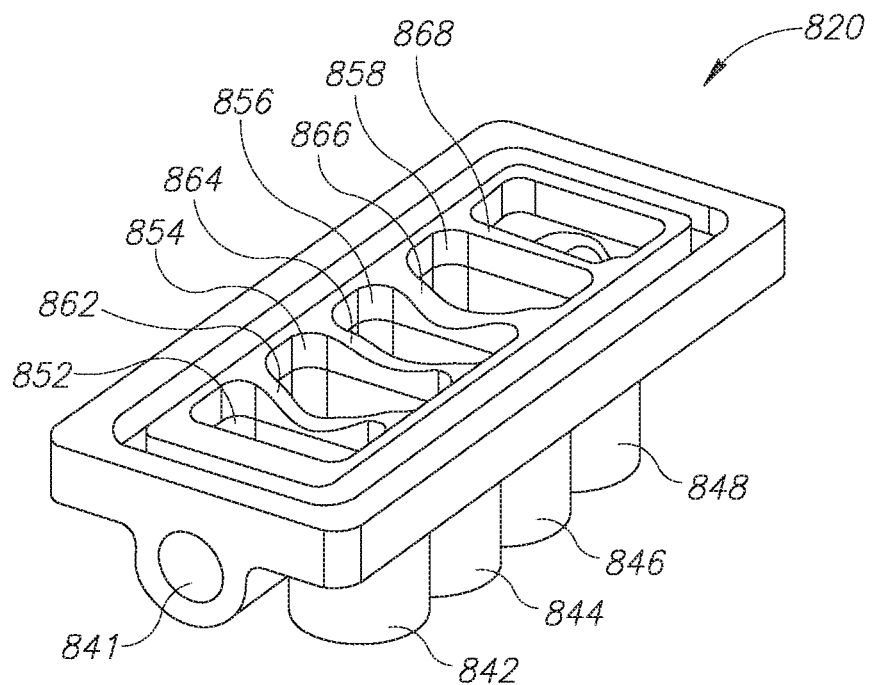
FIGS. 8A & 8B show simplified perspective views of exemplary lower valve housings with different barrier heights separating multiple chambers in the valve, according to some embodiments of the invention.
Figure 8B:
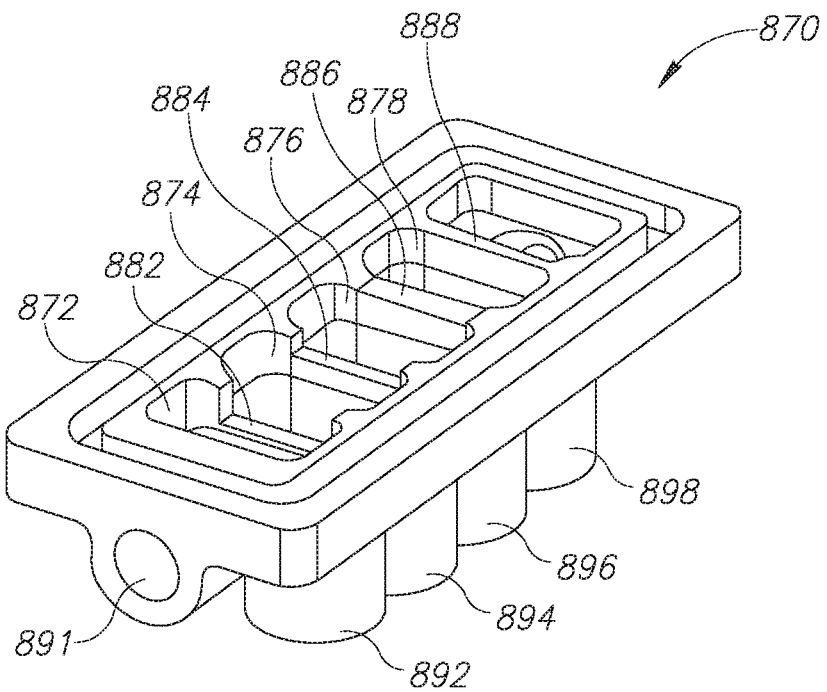

Reference is now made to FIGS. 8A & 8B, which are simplified perspective views of exemplary lower valve housings with different barrier heights separating multiple outlet ports in the valve, according to some embodiments of the invention.

Referring particularly to FIG. 8A, lower housing 820 has a fluid (channel) inlet 841 bored into one side. Lower housing 820 also comprises a multiplicity of outlet ports connected to external chambers (not shown), via outlet channels. In the exemplary embodiment shown, there are four outlet ports 852, 854, 856 and 858. Each port opens to a pair of outlet channels: port 852 opens to outlet channels 842 and 843, port 854 opens to outlet channels 844 and 845, port 856 opens to outlet channels 846 and 847 and port 858 opens to outlet channels 848 and 849 (outlet channels 843, 845, 847 and 849 are not visible in FIG. 8A). It can be seen that barriers 862, 864, 866 and 868 between the outlet ports 852, 854, 856 and 858 are scalloped to differing depths so that the volumes in the pairs of outlet channels 842 and 843, 844 and 845, 846 and 847 and 848 and 849 vary when covered by an elastic membrane. As shown, the volumes in both members of each pair are essentially the same. Fluid inlet 841 opens into outlet port 852 and thus, outlet channels 842 and 843.

Referring now to FIG. 8B, lower housing 870 has a fluid inlet 891 bored into one side. Lower housing 870 also comprises a multiplicity of fluid outlet channels connected to external chambers (not shown), via outlet channels. In the exemplary embodiment shown, there are four outlet ports 872, 874, 876 and 878. Each port opens to a pair of outlet channels: port 872 opens to outlet channels 892 and 893, port 874 opens to outlet channels 894 and 895, port 876 opens to outlet channels 896 and 897 and port 878 opens to outlet channels 898 and 899 (outlet channels 893, 895, 897 and 899 are not visible in FIG. 8B). It can be seen that barriers 882, 884, 886 and 888 between the chambers 872, 874, 876 and 878 are cut to differing heights so that the volumes in the pairs of outlet channels 892 and 893, 894 and 895, 896 and 897 and 898 and 899 vary when covered by an elastic membrane. As shown, the volumes in both members of each pair are essentially the same. Fluid inlet 891 opens into outlet port 872, and thus outlet channels 892 and 893.

As described hereinbelow, when one or more elastic membrane rests within a valve housing atop a multiplicity of outlet ports connected to external chambers, fluid may be injected into a space above the membrane, remote from the outlet ports, forcing the membrane downward to cover and close off access to the ports and the chambers. As fluid is then injected into the chambers via the ports, below the membrane, the membrane is successively displaced from the outlet ports, allowing the chambers to be successively filled with the fluid (refer to FIGS. 11A-11G). When the heights of the barriers between the chambers varies, the volume of fluid the outlet channels may hold varies. As described hereinabove, the volume of fluid a valve outputs into a fixed volume affects the resultant pressure in the output volume. Therefore, varying the volumes in the outlet channels allows for varied output pressure, and the resultant output pressure will vary accordingly, between chamber pairs.

It is understood by persons of skill in the art that the closed volume in multiple outlet channels in a valve can be made to vary in many ways. For example, there may be methods for altering the barrier heights between the outlet channels in ways other than those shown in the two above exemplary embodiments. For example, the valve housing may be formed with different width outlet channels. For example, the valve housing may be formed with different height barriers between the outlet channels. For example, the valve housing may be formed with tapered widths and/or heights. For example, the valve housing may be formed with outlet channels having different barrier heights and/or different widths and/or different heights.

It is understood that this disclosure is intended to include all such modifications, permutations, additions and sub-combinations as are within their true spirit and scope.

Figure 9A:
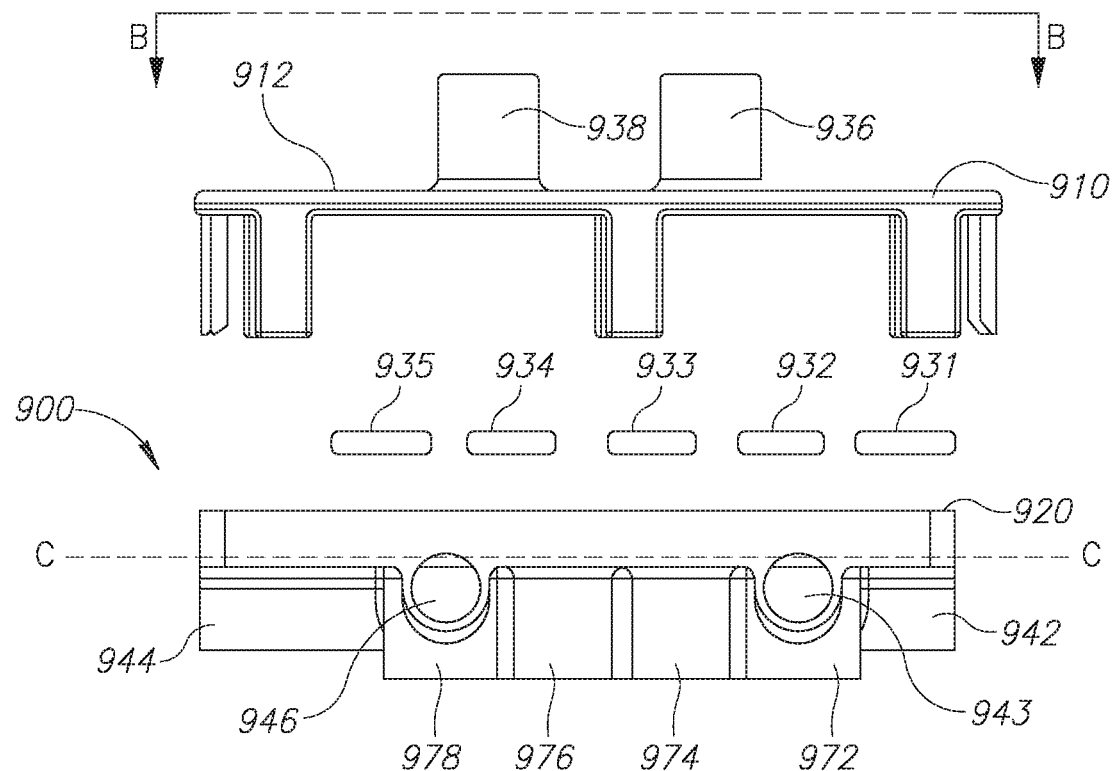
FIGS. 9A, 9B & 9C show simplified exploded, side-sectional and top-sectional views, respectively, of a valve which comprises multiple elastic membranes, the side-sectional view taken along line B-B of FIG. 9A and the top-sectional view taken along line C-C in FIG. 9A, according to some embodiments of the invention.
Figure 9B:
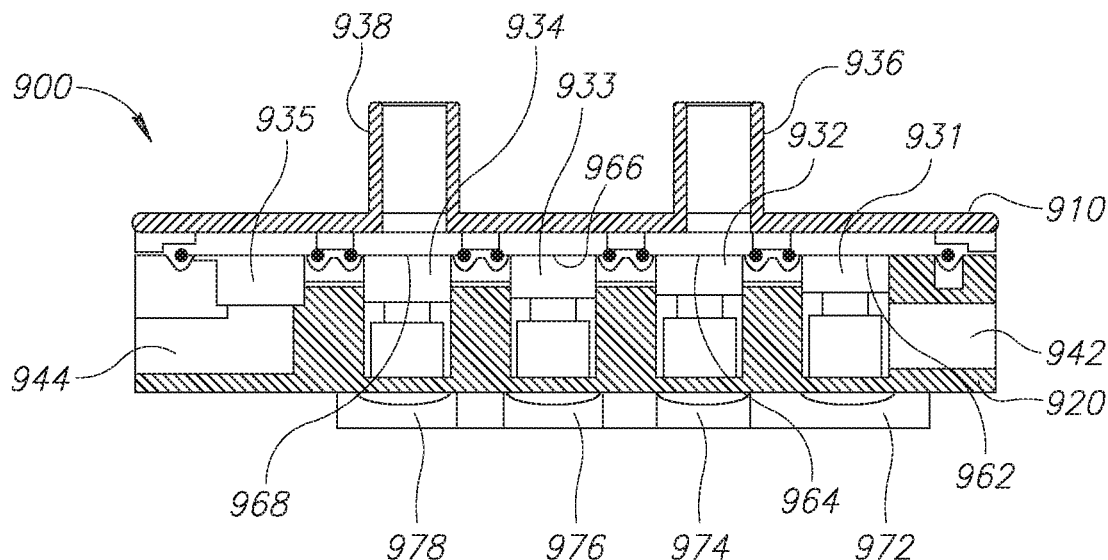
Figure 9C:
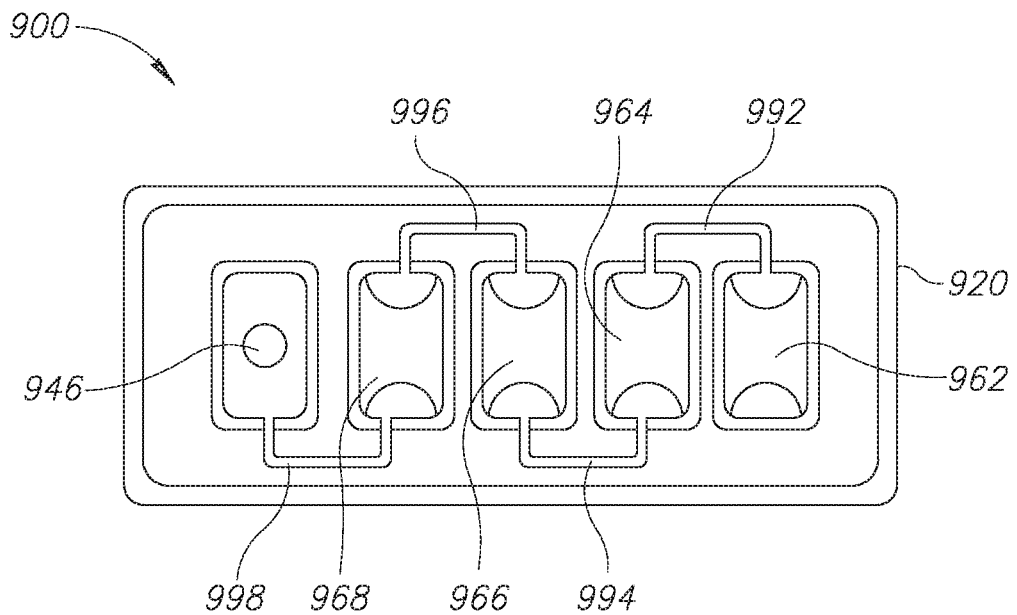

Reference is now made to FIGS. 9A, 9B & 9C, which are simplified exploded, side-sectional and top-sectional views, respectively, of a valve which comprises multiple elastic membranes, the side-sectional view taken along line B-B of FIG. 9A and the top-sectional view taken along line C-C in FIG. 9A, according to some embodiments of the invention. Valve 900 comprises upper and lower housings 910 and 920 which are configured to fixedly snap-fit when pressed together. In some embodiments, valve 900 may comprise a single part; in others, valve 900 may comprise two or more housing portions. In embodiments with valves comprising two or more portions, engagement mechanisms for fixedly joining housing together other than a snap-fit arrangement are possible. These means include, but are not limited to, welding, being screwed together, being affixed by an adhesive such as glue, being fastened together by internal or external methods, or any combination of methods.

Integrally formed facing outward on flat outward-facing surface 912 of upper housing 910 are two hollow cylindrical protrusions, one used as a first fluid (membrane) inlet 936 and the other used as a sensor outlet 938. First fluid inlet 936 may be connected to one or more external fluid source while sensor outlet 938 may be connected to an external pressure monitoring and regulation system (see FIG. 10).

Lower housing 920 has an second fluid inlet 942 (channel) bored into one side and an exhaust channel 944 bored into the opposite side. Sensor outlet 946 and third fluid (channel) inlet 943 are bored into the rear side of lower housing 920. Lower housing 920 also comprises a multiplicity of fluid outlet channels. In the illustrative embodiment shown, there are eight outlet channels 952, 954, 956, 958, 972, 974, 976 and 978. (Outlet channels 952, 954, 956 and 958 are not visible.) Lower housing 920 also comprises outlet ports 962, 964, 966 and 968 corresponding, respectively, to outlet channel pairs 952 and 972, 954 and 974, 956 and 976 and 958 and 978, providing access for filling chambers attached to outlet channel pairs 952 and 972, 954 and 974, 956 and 976 and 958 and 978, with fluid. Second and third fluid inlets 942 and 943 (not visible) open into outlet channel pair 952 and 972 while exhaust channel 944 opens into outlet channel pair 958 and 978, as shown particularly in FIG. 9B.

Elastic membranes 931, 932, 933, 934 and 935 are shaped to fit within the closed valve housing, as shown particularly in FIG. 9B. When upper and lower housing 910 and 920 are fixedly snap-fit together, enclosing elastic membranes 931, 932, 933, 934, and 935, elastic membranes 931, 932, 933, 934 cover each of the outlet ports 962, 964, 966 and 968, respectively, while elastic membrane 935 covers exhaust channel 944.

Referring in particular to FIG. 9C, it is seen that outlet ports 962, 964, 966 and 968 are linked by bracket-shaped passageways 992, 994, 996 and 998. Passageways 992, 994, 996 and 998 allow fluid to flow from outlet ports 962 to 964, 964 to 966, 966 to 968 and outlet port 968 to exhaust channel 944, respectively.

As described in more detail below, particularly with reference to FIGS. 11A-11G, one or more external fluid source (not shown) may be connected to first fluid inlet 936 in upper housing 910 and fluid may be injected into first fluid inlet 936. Fluid flowing from inlet 936 pressurizes the space above elastic membranes 932, 932, 933, 934 and 935 (remote from outlet channel pairs 952 and 972, 954 and 974, 956 and 976 and 958 and 978) and creates downward force on elastic membranes 932, 932, 933 and 934, which are caused to cover outlet ports 962, 964, 966 and 968 and close off access to outlet channels 954, 956, 958, 974, 976 and 978 from within the valve when the downward pressure is great enough. (Access to outlet channels 952 and 972 is not closed off because of direct access from second and third inlets 942 and 943, as described above.) Fluid injected into first fluid inlet 936 also forces elastic membrane 935 downward to cover, and prevent access to, exhaust channel 944. One or more external fluid source continues to inject fluid into first fluid inlet 936 until external pressure sensor (not shown), connected to sensor outlet 938, detects that the pressure above elastic membrane structure 930 has reached a pre-determined level.

One or more external fluid source (not shown) may inject fluid into second and/or third fluid inlets 942 and 943 so that fluid flows into outlet port 962, feeding fluid to a pair of externally attached chambers (not shown) via outlet channels 952 and 972, through the opening from second and third fluid inlets 942 and 943, described above. When external chambers attached at outlet channels 952 and 972 are filled, continued injection of fluid into second and/or third fluid inlets 942 and 943 exerts upward pressure on, and displaces upward, elastic membrane 931. This opens access to port 964 so that fluid then flows into chamber port 964, through outlet channels 954 and 974, into the attached pair of external chambers (not shown). When chambers attached to outlet channels 954 and 974 become filled, continued injection of fluid into second and/or third fluid inlets 942 and 943 exerts upward pressure on, and displaces upward, elastic membrane 932. This process continues in like fashion until external chambers (not shown) attached at outlet channel pairs 956 and 976 and 958 and 978 are also filled, in succession.

Continued injection of fluid into second and/or third fluid inlets 942 and 943 after external chambers attached at outlet channels 952, 954, 956, 958, 972, 974, 976 and 978 are filled causes pressure to build inside each of the external chambers attached to the valve, as well as within the valve itself. This increased pressure is detected by the pressure sensor attached to sensor outlet 946 and the controller is notified. When the pressure reaches a pre-defined pressure level, the controller sends a signal instructing the one or more fluid source to cease injecting fluid. In some cases, the injection of fluid may be halted immediately upon such notice. In other cases, the fluid source(s) may continue injecting fluid for a pre-determined amount of time.

Fluid pressure above elastic membrane 935 begins to ease once fluid injection into upper housing 910 ceases. As the fluid pressure above elastic membrane 935 eases, elastic membrane 935 is pushed upward via the fluid pressure in the external chambers connected at outlet channels 952, 954, 956, 958, 972, 974, 976 and 978, below elastic membrane 935. This allows fluid to be evacuated from the external chambers connected to outlet channels 952, 954, 956, 958, 972, 974, 976 and 978 through chamber ports 962, 964, 966 and 968 and into exhaust channel 944 as an entry from outlet port 968 into exhaust channel 944 is created by the lifting of elastic membrane 935. All external chambers are deflated as the fluid is evacuated from them.

As described hereinabove, when one or more elastic membrane rests within a valve housing atop a multiplicity of fluid outlet channels, fluid may be injected into a space above the membranes, remote from the outlet ports, forcing the membranes downward to cover and close off access to the ports. As fluid is then injected into the outlet channels, below the membranes, the membranes are successively displaced from the outlet ports, allowing the chambers attached to the outlet channels to be successively filled with the fluid (refer to FIGS. 11A-11G). When the size of the individual membranes above the chambers varies, the upward force needed to displace them from the chamber ports also varies. Thus, the pressure needed to "fill" the chambers varies and the output pressure will vary accordingly, between chamber pairs.

Figure 10:
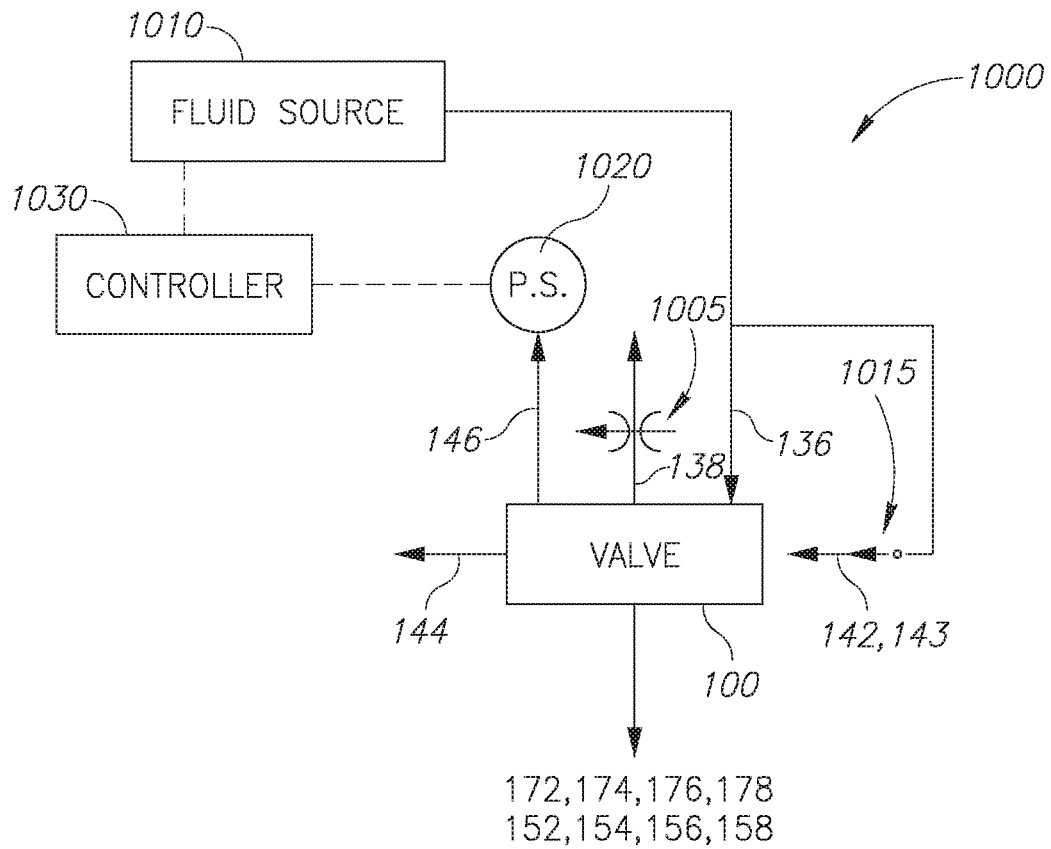
FIG. 10 shows a simplified system diagram for control of an external pressure monitoring and regulation system, according to some embodiments of the invention.

Reference is now made to FIG. 10, which is a simplified system diagram for control of an external pressure monitoring and regulation system, according to some embodiments of the invention. External pressure monitoring and regulation system 1000 comprises one or more fluid source 1010, a pressure sensor 1020 and a controller 1030. In the diagram, embodiments such as those shown in FIGS. 1A & 1B (valve 100) are used as exemplary valves for reference purposes. It is understood that valve 100 serves only as an exemplary valve and that FIG. 10 represents an exemplary external pressure monitoring and regulation system for use with any embodiments of the present invention.

One or more fluid source 1010 may be, for example, a pump or pumps. Pressure sensor 1020 may be an electrical or mechanical device or any other measuring or detecting method. Controller 1030 may be a computer or CPU, a mechanical device or a combination of human and/or mechanical device and/or computer with an appropriate interface.

Controller 1030 may be electronically connected both to the one or more fluid source 1010 and the pressure sensor 1020 for example by wires or, wirelessly, via bluetooth, infrared and/or wideband, managing the one or more fluid source 1010 based on measurements taken by pressure sensor 1020. One or more fluid source 1010 may be mechanically connected to valve 100 at both first fluid inlet 136 and second and third fluid inlets 142 and 143. One or more fluid source 1010 may also be electronically connected to controller 1030, for example by wires or, wirelessly, via bluetooth, infrared and/or wideband. When commanded by the controller 1030, one or more fluid source 1010 may inject fluid into both first fluid inlet 136 and second and/or third fluid inlets 142 and 143 or, when commanded, cease to inject fluid. Pressure sensor 1020 may monitor fluid pressure at valve outlet 146 and report to controller 1030. Pressure regulator 1005 connected to outlet 138 controls the pressure above the membrane and consequently the pressure in the chambers. Controller 1030 may further signal one or more fluid source 1010 to stop causing chambers attached to outlet channels 152, 154, 156, 158, 172, 174, 176 and 178 to be filled, once pressure monitor 1020 determines that valve has been fully pressurized.

Figure 11A:
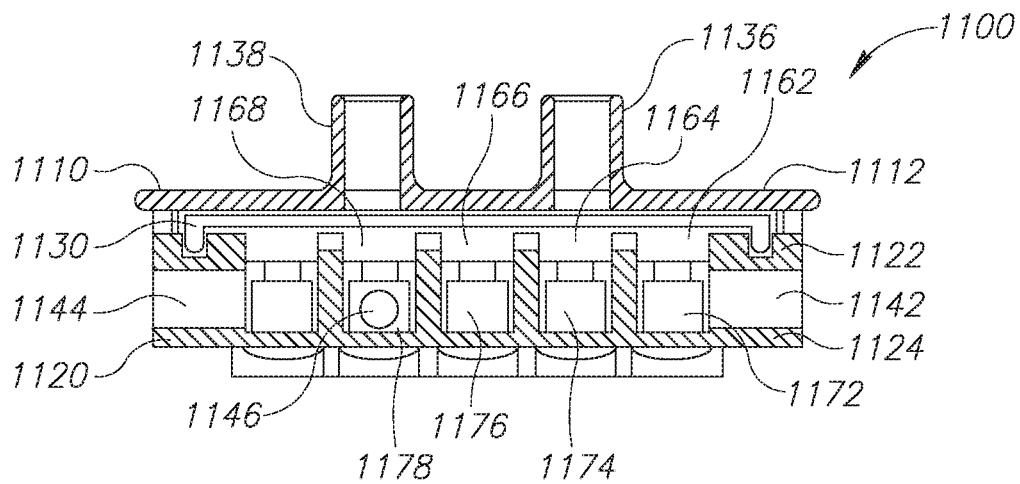
FIGS. 11A, 11B, 11C, 11D, 11E, 11F & 11G show simplified rear-sectional views, similar to the view of FIG. 9B, of a multi-chamber valve in progressive stages of operation, according to some embodiments of the invention.
Figure 11B:
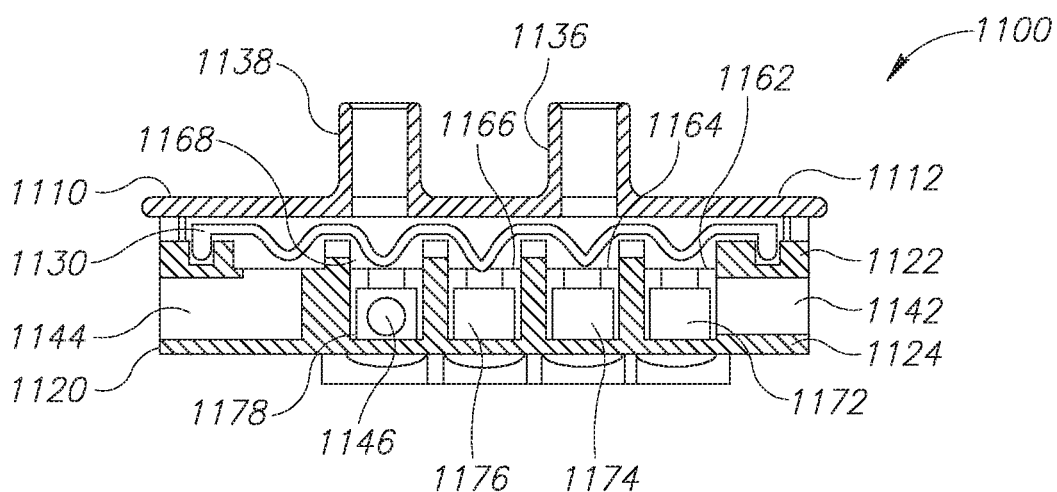
Figure 11C:
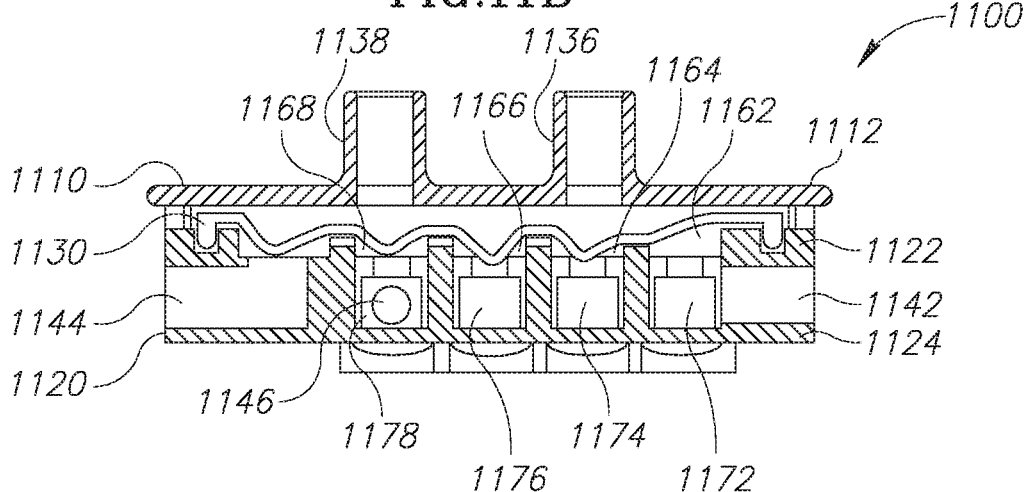
Figure 11D:
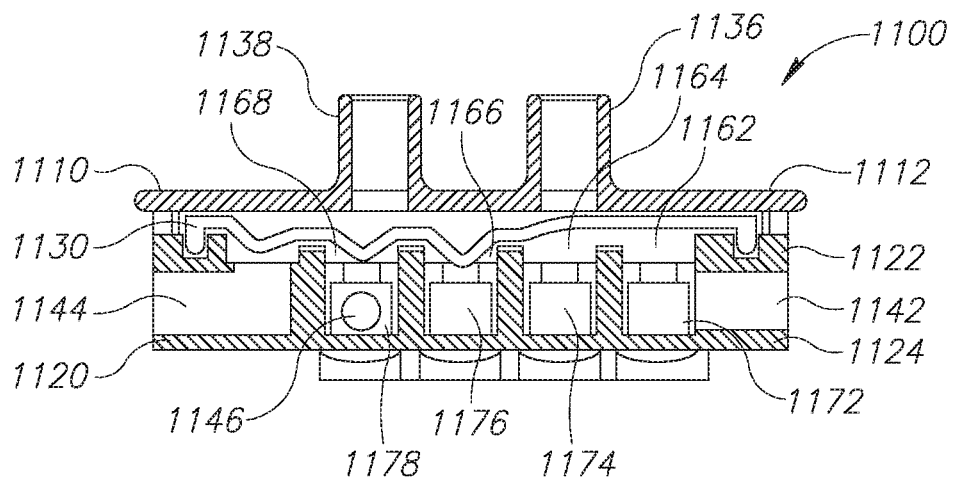
Figure 11E:
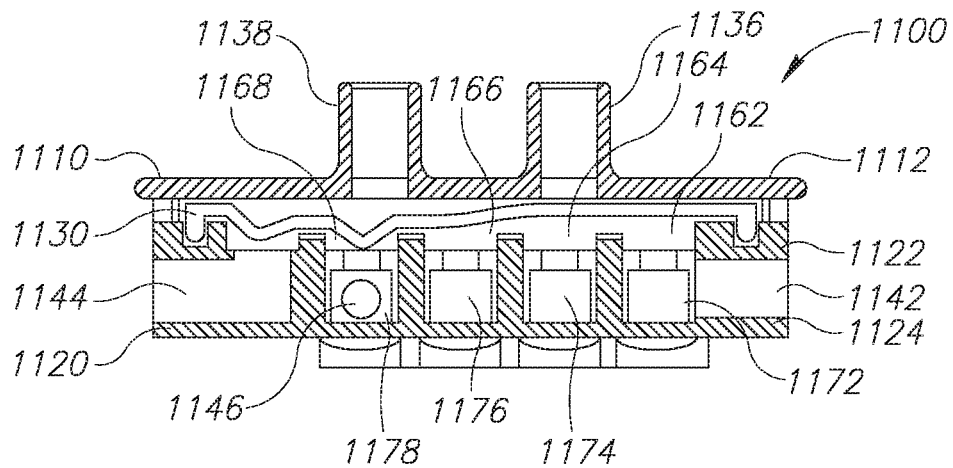
Figure 11F:
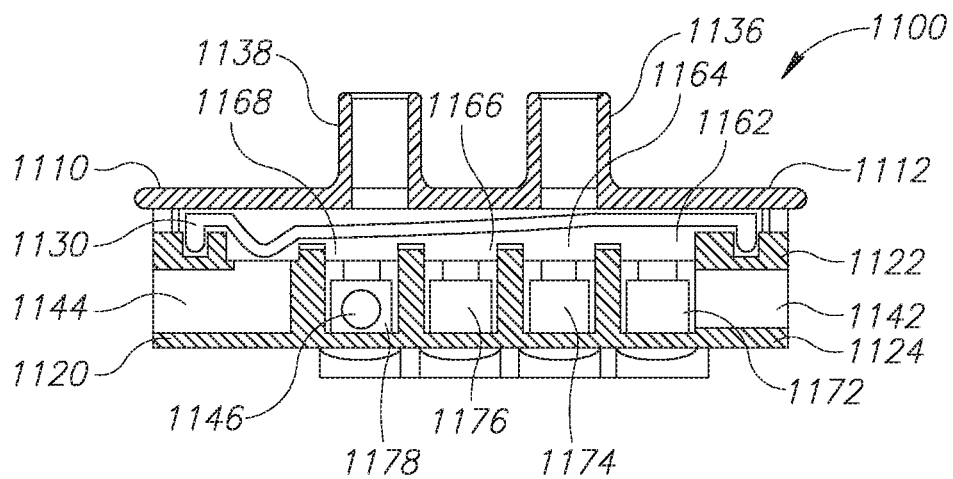
Figure 11G:
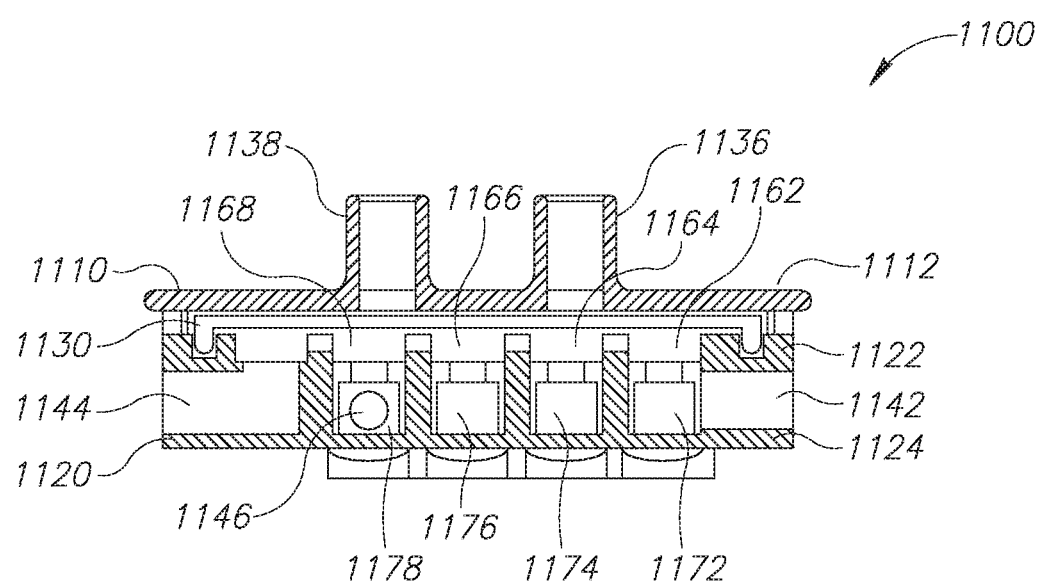

Reference is now made to FIGS. 11A, 11B, 11C, 11D, 11E, 11F & 11G, which are simplified rear-sectional views, similar to the view of FIG. 9B, of a multi-chamber valve in progressive stages of operation, according to some embodiments of the invention. The progression begins (FIG. 11A) with the valve deflated, moves through the process of successively filling chambers attached to valve outlet channels (FIGS. 11B-11E) then emptying them (FIG. 11F) and returns to the deflated state (FIG. 11G).

In each of FIGS. 11A, 11B, 11C, 11D, 11E, 11F & 11G, the upper and lower housings 1110 and 1120 are fixedly snap-fit together, enclosing an elastic membrane structure 1130. It is understood that elastic membrane structure 1130 represents any elastic membrane structure or set of elastic membranes in the embodiments depicted hereinabove in FIGS. 2A-4C, 6 and 9A, variants thereof and any embodiments not shown but included as part of this disclosure. Integrally formed facing outward on flat outward-facing surface 1112 of upper housing 1110 are two hollow cylindrical protrusions, one used as a first fluid inlet 1136 (membrane) and the other used as a sensor outlet 1138. First fluid inlet 1136 may be connected to one or more external fluid source while sensor outlet 1138 may be connected to an external pressure monitoring and regulation system (see FIG. 10).

Lower housing 1120 comprises upper and lower portions 1122 and 1124. Upper portion 1122 comprises an outer surface having a substantially rectangular cross-section. Lower portion 1124 comprises a multiplicity of chambers, at least one inlet and at least one outlet. Lower housing 1120 has a second fluid inlet 1142 (channel) bored into one side of lower portion 1124 and an exhaust channel 1144 bored into the opposite side. Third fluid inlet (channel) 1143 and sensor outlet 1146 are bored into rear side of lower portion 1124 (not visible in FIGS. 11A-11G).

Lower portion 1124 comprises a multiplicity of fluid outlet channels. In the exemplary embodiment shown, there are eight outlet channels 1152, 1154, 1156, 1158, 1172, 1174, 1176 and 1178 (outlet channels 1152, 1154, 1156 and 1158 are on front of valve and are thus not visible in FIGS. 11A-11G). Upper portion 1122 of lower housing 1120 also comprises outlet ports 1162, 1164, 1166 and 1168 corresponding, respectively, to outlet channel pairs 1152 and 1172, 1154 and 1174, 1156 and 1176 and 1158 and 1178, providing access for filling chambers (not shown) externally attached at outlet channel pairs 1152 and 1172, 1154 and 1174, 1156 and 1176 and 1158 and 1178, with fluid. (Each port opens to the corresponding pair of outlet channels.) Second and third fluid inlets 1142 and 1143 open into outlet port 1152 while exhaust channel 1144 opens into outlet port 1158.

When upper and lower housing 1110 and 1120 are fixedly snap-fit together, enclosing elastic membrane structure 1130, elastic membrane structure 1130 may rest over ports 1162, 1164, 1166 and 1168.

Initially, elastic membrane structure 1130 is in a relaxed state (FIG. 11A). As shown, it sits just below the ceiling of upper housing 1110. When fluid is injected into upper housing 1110 through first fluid inlet 1136, the fluid exerts downward pressure on elastic membrane structure 1130, causing it to become deformed and to cover outlet ports 1162, 1164, 1166 and 1168 (FIG. 11B). As fluid is subsequently injected into second and/or third fluid inlets 1142 and 1143, chambers attached to outlet channels 1152 and 1172 fill up with fluid.

Once chambers attached at outlet channels 1152 and 1172 are filled, continued injection of fluid into second and/or third fluid inlets 1142 and 1143 exerts upward pressure on elastic membrane structure 1130 and displaces it, so it no longer covers outlet port 1164 (FIG. 11C). Eventually, as fluid continues to be injected, the elastic membrane structure will be sufficiently displaced to allow fluid to flow into outlet port 1164 and through outlet channels 1154 and 1174 (FIG. 11D) into externally attached chambers (not shown).

Once chambers attached at outlet channels 1154 and 1174 are filled, continued injection of fluid into second and/or third fluid inlets 1142 and 1143 exerts upward pressure on elastic membrane structure 1130 and displaces it, so it no longer covers outlet port 1166. Eventually, as fluid continues to be injected, the elastic membrane structure will be sufficiently displaced to allow fluid to flow into outlet port 1166 and through outlet channels 1156 and 1176 into externally attached chambers (not shown) (FIG. 11E).

Once chambers attached to outlet channels 1156 and 1176 are filled, continued injection of fluid into second and/or third fluid inlets 1142 and 1143 exerts upward pressure on elastic membrane structure 1130 and displaces it, so it no longer covers outlet port 1168. Eventually, as fluid continues to be injected, elastic membrane structure 1130 will be sufficiently displaced to allow fluid to flow into outlet port 1168 and through outlet channels 1158 and 1178 into externally attached chambers (not shown) (FIG. 11F).

Eventually, chambers attached at outlet channels 1158 and 1178 become filled and thus all chambers externally attached at outlet channels 1152, 1154, 1156, 1158, 1172, 1174, 1176 and 1178 have been filled. Continued injection of fluid into second and/or third fluid inlets 1142 and 1143 causes pressure to build inside the valve. This increased pressure is detected by the external pressure sensor attached to sensor outlet 1146 and the controller is notified. When the pressure reaches a pre-defined pressure level, the controller sends a signal instructing the one or more fluid source to cease injecting fluid. In some cases, the injection of fluid may be halted immediately upon such notice. In other cases, the fluid source(s) may continue injecting fluid for a pre-determined amount of time, as the valve holds the controlled pressure.

When fluid injection stops, the pressure in the space between elastic membrane structure 1130 and upper housing 1110 eases and elastic membrane structure 1130 is pushed upward further via the pressure in chambers attached at outlet channels 1152, 1154, 1156, 1158, 1172, 1174, 1176 and 1178 below elastic membrane structure 1130. This allows fluid to flow from and be evacuated from chambers attached at outlet channels 1152, 1154, 1156, 1158, 1172, 1174, 1176 and 1178 through exhaust channel 1144 as an entry from outlet 1178 to exhaust channel 1144 is created by the lifting of the elastic membrane. Chambers attached at outlet channels 1152, 1154, 1156, 1158, 1172, 1174, 1176 and 1178 are deflated as all the fluid is eventually evacuated from them. At that point, elastic membrane structure 1130 has substantially returned to the original shape and position, just below the ceiling of upper housing 1110 (FIG. 11G).

Exemplary embodiments depicted in the above-described FIGS. 11A-11G show only valves formed of a pair of upper and lower housings. It is understood that other embodiments may comprise unitary valve construction, i.e.; valve housings constructed as single units, or valve housings constructed of a multiplicity of parts.

Exemplary embodiments depicted in the above-described FIGS. 11A-11G show only valves with outlet ports opening to pairs of outlet channels. It is understood that other embodiments may comprise ports opening to single outlet channels, or more than two outlet channels.

FIGS. 12A, 12B, 12C & 12D show simplified bottom and top perspective views and two exploded views, respectively, of a multi-chamber valve, according to some embodiments of the invention.

Figure 12A:
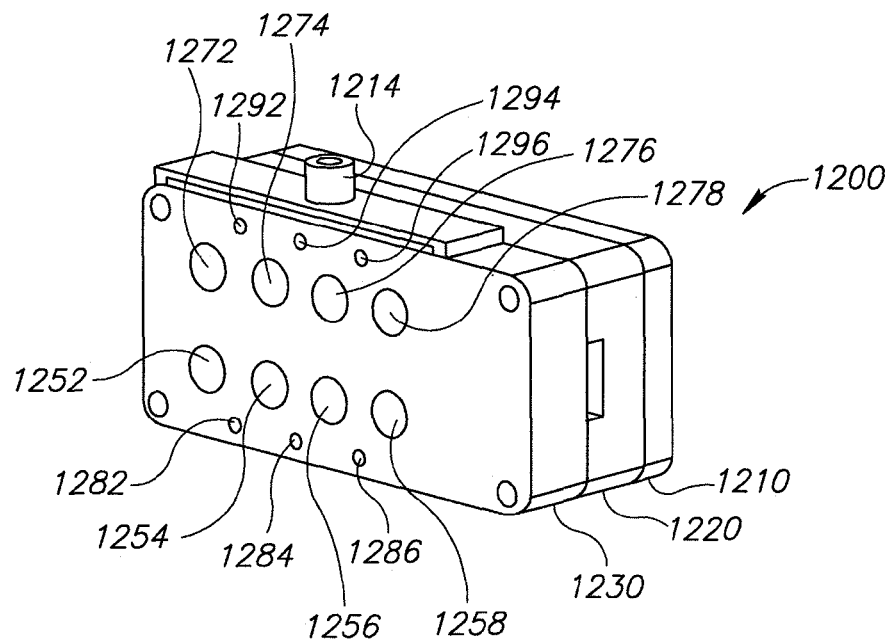
FIGS. 12A, 12B, 12C & 12D show simplified bottom and top perspective views and two exploded views, respectively, of a multi-chamber valve, according to some embodiments of the invention.
Figure 12B:
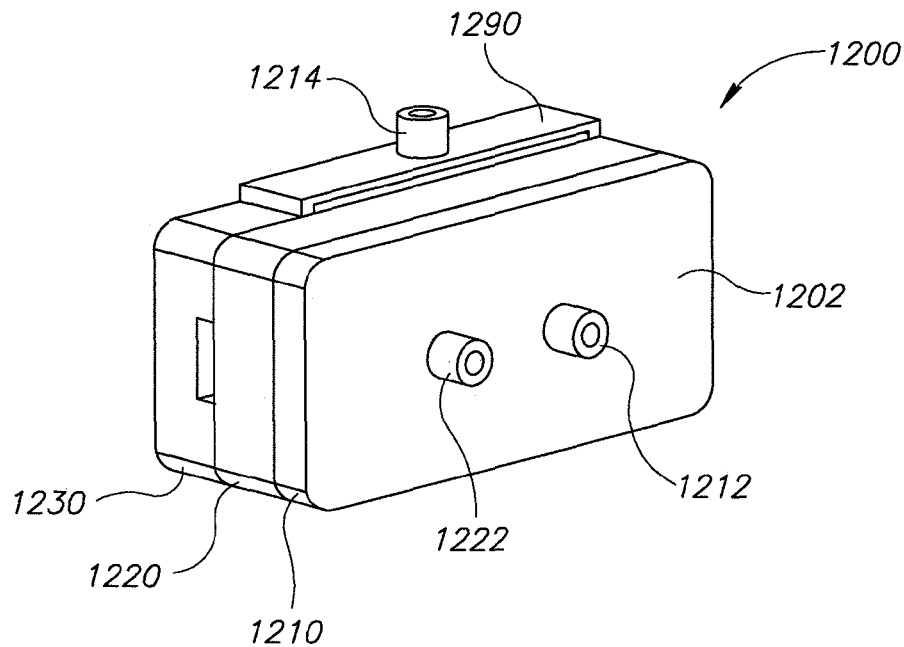

As shown in FIGS. 12A & 12B particularly, valve 1200 comprises upper, middle and lower housings 1210, 1220 and 1230 which are fixedly engaged. In some embodiments, valve housing may comprise a single part; in others, valve 1200 may comprise two or more housing portions. In embodiments with valves comprising two or more portions, engagement mechanisms for fixedly joining housing together may include, but are not limited to, a snap-fit arrangement, welding, being screwed together, being affixed by an adhesive such as glue, being fastened together by internal or external methods, or any combination of methods.

Upper housing 1210 has a flat outward-facing surface 1202. Integrally formed facing outward on flat outward-facing surface 1202 of upper housing 1210 are two hollow cylindrical protrusions, a first fluid inlet 1212 and a sensor outlet 1222. First fluid (membrane) inlet 1212 may be connected to one or more external fluid source (not shown) while sensor outlet 1222 may be connected to an external pressure monitoring and regulation system (not shown; refer to FIG. 10).

Lower housing 1230 comprises a multiplicity of fluid outlets. In the exemplary embodiment shown, there are eight outlet channels 1252, 1254, 1256, 1258, 1272, 1274, 1276 and 1278. As in other embodiments described above, chambers may be attached externally to the valve (not shown) at each of the outlet channels, and may be filled with fluid, from the valve, through the outlet channels. Lower housing 1230 further comprises fluid exhaust apertures 1282, 1284 and 1286 bored into the front side of the bottom of lower housing 1230 and fluid exhaust apertures 1292, 1294 and 1296 bored into the rear side of the bottom of lower housing 1230.

Rear exhaust guard 1290 has a substantially rectangular cross-section with substantially flat inward- and outward-facing surfaces. Rear exhaust guard 1290 may be fixedly attached to rear of valve 1200, adjacent rear exhaust apertures 1292, 1294 and 1296. Integrally formed facing outward on rear exhaust guard 1290 is a hollow cylindrical protrusion, second fluid (channel) inlet 1214. Second fluid inlet 1214 may be connected to one or more external fluid source (not shown).

Figure 12C:
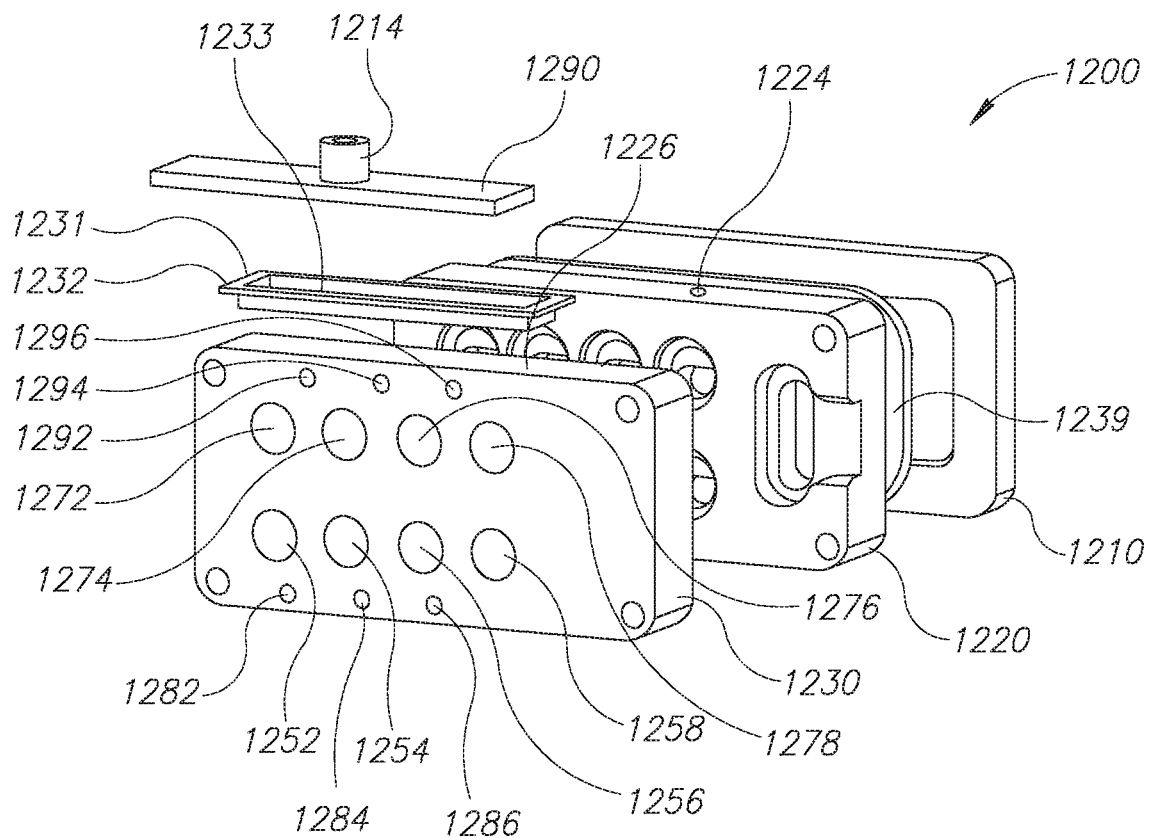

Referring now to FIG. 12C, it is seen that rear elastic membrane structure 1231 is enclosed between rear exhaust guard 1290 and lower housing 1230 when rear exhaust guard 1290 is fixed to lower housing 1230. Rear elastic membrane structure 1231 comprises a frame 1232 and an elastic membrane 1233. Formed in elastic membrane 1233 is a substantially rectangular depression that is configured to be inserted within rear fluid access and membrane receptacle 1226 in lower housing 1230. A second sensor outlet 1224 is bored into rear of middle housing 1230. Sensor outlet 1224 may be connected to an external pressure monitoring and regulation system (not shown; refer to FIG. 10).

Figure 12D:
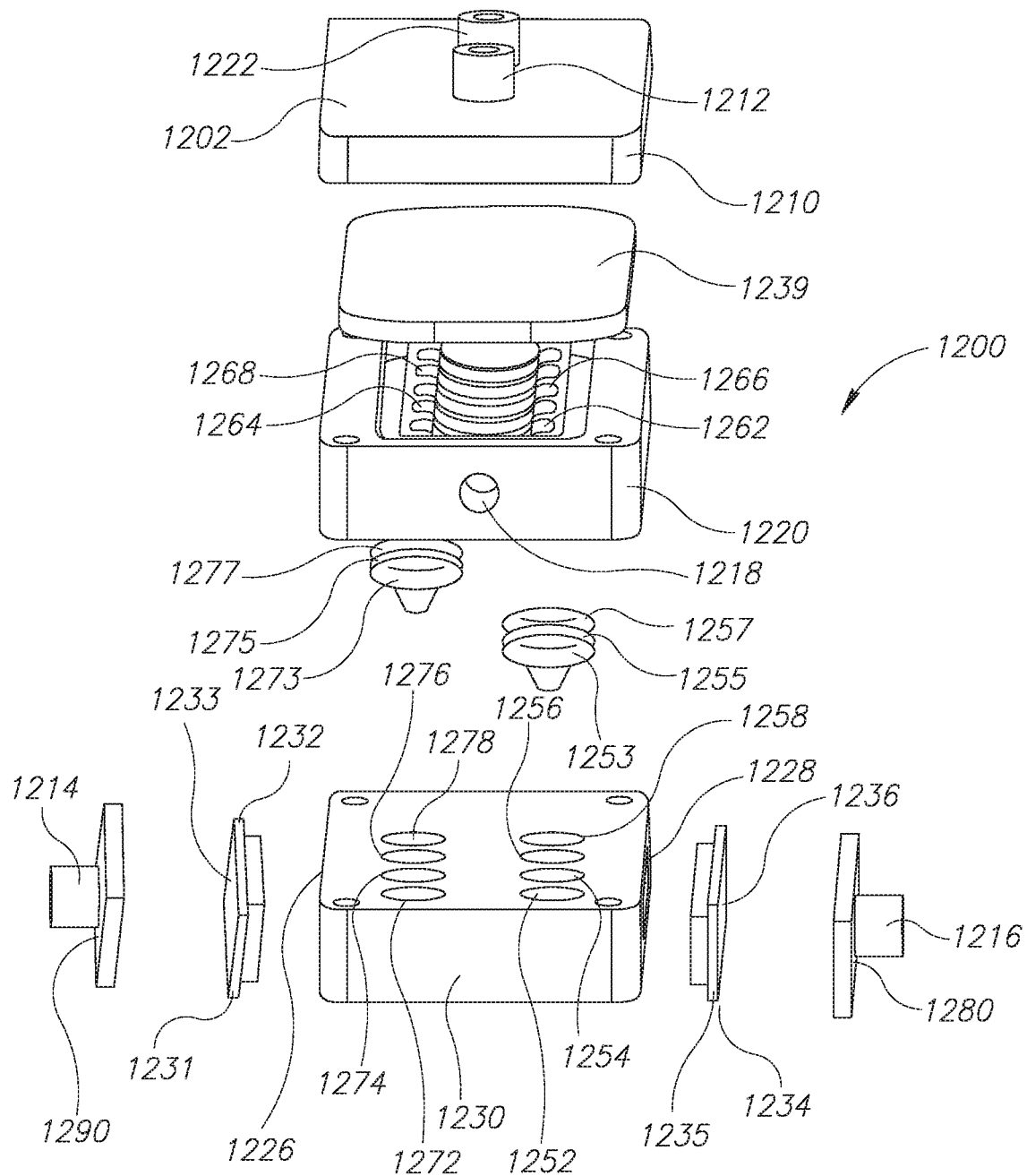

Referring now to FIG. 12D, it is seen that forward elastic membrane structure 1234 is enclosed between forward exhaust guard 1280 and lower housing 1230 when forward exhaust guard 1280 is fixed to lower housing 1230. Forward elastic membrane structure 1234 comprises a frame 1235 and an elastic membrane 1236. Formed in elastic membrane 1236 is a substantially rectangular depression that is configured to be inserted within forward fluid access and membrane receptacle 1228 in lower housing 1230. Forward exhaust guard 1280 has a substantially rectangular cross-section with substantially flat inward- and outward-facing surfaces. Forward exhaust guard 1280 may be fixedly attached to front of valve 1200, adjacent to forward exhaust apertures 1282, 1284 and 1286 (not visible in FIG. 12D; refer to FIGS. 12A & 12C). Integrally formed facing outward on forward exhaust guard 1280 is a hollow cylindrical protrusion, third fluid inlet 1216. Third fluid inlet 1216 may be connected to one or more external fluid source (not shown).

Middle housing 1220 comprises a multiplicity of fluid ports. In the exemplary embodiment shown, there are four outlet ports 1262, 1264, 1266 and 1268. Bored into the side of middle housing 1220 is fourth fluid inlet 1218. Fourth fluid inlet 1218 may be connected to one or more external fluid source (not shown). When upper, middle and lower housings 1210, 1220 and 1230 are affixed together, each outlet port aligns with a pair of outlet channels in lower housing 1230. For example, port 1262 aligns with outlet channels 1252 and 1272. For example, port 1264 aligns with outlet channels 1254 and 1274, and so on. Outlet ports 1262, 1264, 1266 and 1268 thus provide access for filling fluid-tight external chambers (not shown), attached to valve 1200 at outlet channels 1252, 1254, 1256, 1258, 1272, 1274, 1276 and 1278, with fluid.

Fourth fluid inlet 1218 opens into outlet port 1262 and thus provides access to outlet channels 1252 and 1272. Upper and middle housing 1210 and 1220 enclose upper elastic membrane 1239 when fixedly attached. Upper elastic membrane 1239 may rest over outlet ports 1262, 1264, 1266 and 1268, when enclosed.

Forward exhaust apertures 1282, 1284 and 1286 open into forward fluid access and membrane receptacle 1228 while rear exhaust apertures 1292, 1294 and 1296 (not visible in FIG. 12D; refer to FIGS. 12A & 12C) open into rear fluid access and membrane receptacle 1226. Outlet channels 1252, 1254, 1256 and 1258 open to forward fluid access and membrane receptacle 1228 while outlet channels 1272, 1274, 1276 and 1278 open to rear fluid access and membrane receptacle 1226. Exhaust apertures may be used to vent the outlet channels, via the forward and rear fluid access and membrane receptacles 1228 and 1226, to prevent any attached chambers from being filled, or to exhaust any filled attached chambers, whenever it is undesirable for chambers to be filled with fluid.

Valve 1200 further comprises a set of eight one-way check valves 1253, 1255, 1257, 1259, 1273, 1275, 1277 and 1279 (1259 and 1279 not visible). These are inserted in outlet channels 1252, 1254, 1256, 1258, 1272, 1274, 1276 and 1278, respectively, and reside between middle and lower housings 1220 and 1230 when middle and lower housings 1220 and 1230 are fixedly engaged. Typically, corresponding pairs of check valves are set to open at the same pressure and allow fluid flow through them, from the corresponding outlet port, to the corresponding pair of outlet channels, to chambers externally attached at those outlet channels. For example, check valves 1253 and 1273 are set to close at some pressure, $P_1$, and allow fluid to flow from outlet port 1262, through outlet channels 1252 and 1272 and into chambers attached at outlet channels 1252 and 1272. For example, check valves 1255 and 1275 are set to close at some pressure, $P_2$ (with $P_1 \neq P_2$, generally), and allow fluid to flow from outlet port 1264, through outlet channels 1254 and 1274 and into chambers attached at outlet channels 1254 and 1274, and so on.

Between chamber inflation cycles, the elastic membranes 1233 and 1236 are relaxed and allow any fluid contained in chambers attached to fluid outlet channels 1252, 1254, 1256, 1258, 1272, 1274, 1276 and 1278 to escape or be exhausted via exhaust apertures 1282, 1284, 1286, 1292, 1294 and 1296. At the beginning of an inflation cycle, one or more fluid source (not shown) is caused to inject fluid into fluid inlets 1212, 1214 and 1216. Injection of fluid into second fluid inlet 1214 causes elastic membrane 1236 to seal off fluid exhaust apertures 1282, 1284 and 1286 while injection of fluid into third fluid inlet 1216 causes elastic membrane 1233 to seal off fluid exhaust apertures 1292, 1294 and 1296. This prevents outlet channels 1252, 1254, 1256, 1258, 1272, 1274, 1276 and 1278 from exhausting fluid through the fluid exhaust apertures 1282, 1284, 1286, 1292, 1294 and 1296. Injection of fluid into first fluid inlet 1212 forces upper elastic membrane 1239 to cover and close off outlet ports 1262, 1264, 1266 and 1268. Fluid continues to be injected into second and third inlets 1214 and 1216 and reaches a pre-determined pressure level, designed to maintain the positions of elastic membranes 1233 and 1236 during chamber inflation and prevent exhaust apertures 1282, 1284, 1286, 1292, 1294 and 1296 from exhausting fluid from chambers attached at outlet channels 1252, 1254, 1256, 1258, 1272, 1274, 1276 and 1278, throughout the inflation process. Fluid also continues to be injected into first fluid inlet 1212, also until a pre-determined pressure level is reached, so that downward pressure is maintained on upper elastic membrane 1239.

One or more fluid source then begins to inject fluid into fourth fluid inlet 1218. Fluid first flows through outlet port 1262, through one-way check valves 1253 and 1273, into outlet channels 1252 and 1272 and into chambers attached externally thereof. When the fluid flowing into chambers attached at outlet channels 1252 and 1272 reaches the pressure setting for check valves 1253 and 1273 (call it $P_a$), check valves 1253 and 1273 close and prevent further fluid flowing through. At that point, those chambers are filled.

Continued injection of fluid by one or more fluid source into fourth fluid inlet 1218 builds fluid pressure above check valves 1253 and 1273 upward through outlet port 1262 and eventually pushes elastic membrane 1239 upward, displacing the membrane upward and opening access for the fluid to flow into outlet port 1264. Fluid flows through outlet port 1264, through one-way check valves 1255 and 1275, into outlet channels 1254 and 1274 and into chambers attached externally thereof. When the fluid flowing into chambers attached at outlet channels 1254 and 1274 reaches the pressure setting for check valves 1255 and 1275 (call it $P_b$), check valves 1255 and 1275 close and prevent further fluid flowing through. At that point, those chambers are filled.

Continued injection of fluid by one or more fluid source into fourth fluid inlet 1218 builds fluid pressure above check valves 1255 and 1275 upward through outlet port 1264 and eventually pushes elastic membrane 1239 upward, displacing the membrane upward and opening access for the fluid to flow into outlet port 1266. Fluid flows through outlet port 1266, through one-way check valves 1257 and 1277, into outlet channels 1256 and 1276 and into chambers attached externally thereof. When the fluid flowing into chambers attached at outlet channels 1256 and 1276 reaches the pressure setting for check valves 1257 and 1277 (call it $P_c$), check valves 1257 and 1277 close and prevent further fluid flowing through. At that point, those chambers are filled.

Continued injection of fluid by one or more fluid source into fourth fluid inlet 1218 builds fluid pressure above check valves 1257 and 1277 upward through outlet port 1266 and eventually pushes elastic membrane 1239 upward, displacing the membrane upward and opening access for the fluid to flow into outlet port 1268. Fluid flows through outlet port 1268, through one-way check valves 1259 and 1279, into outlet channels 1258 and 1278 and into chambers attached externally thereof. When the fluid flowing into chambers attached at outlet channels 1258 and 1278 reaches the pressure setting for check valves 1259 and 1279 (call it $P_d$), check valves 1259 and 1279 close and prevent further fluid flowing through. At that point, all externally attached chambers are filled.

Continued injection of fluid by one or more fluid source into fourth fluid inlet 1218 causes fluid pressure in the valve to rise. This increased pressure is sensed by the pressure monitor (not shown) attached at sensor outlet 1224 (not visible in FIG. 12D; refer to FIG. 12C) and reported to controller (not shown). When the pressure reaches a pre-determined level, the controller sends a signal instructing the one or more fluid source to cease injecting fluid. In some cases, fluid injection is halted immediately. In some cases, fluid continues to be injected for a pre-determined amount of time.

Fluid pressure in the valve begins to drop once fluid injection is halted. Pressure on elastic membranes 1233, 1236 and 1239 is eased and exhaust apertures are uncovered, allowing chambers externally attached to the valve at outlet channels 1252, 1254, 1256, 1258, 1272, 1274, 1276 and 1278 to be exhausted through exhaust apertures 1282, 1284, 1286, 1292, 1294 and 1296. This completes an inflation and deflation cycle.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

What is claimed is:

1. A valve for successive filling of fluid cells of a compression therapy device, the valve comprising:
   at least two ports, each port opening to at least one fluid outlet channel, each fluid outlet channel being configured to connect to a fluid cell of a compression therapy device;
   a first elastic membrane having a varying physical property along at least one dimension thereof, said first elastic membrane configured to cover said ports to cause varying pressure among said fluid cells when fluid is injected into said fluid cells through said fluid outlet channels, said first elastic membrane comprises a depression spanning the two or more ports, wherein said depression comprises a varying geometric pattern along at least part of a perimeter thereof;
   at least one membrane fluid inlet configured to provide fluid so as to apply pressure on one side of said first elastic membrane, thereby causing said first elastic membrane to cover and block access to said ports;
   at least one channel fluid inlet configured to provide fluid to said fluid outlet channels, to apply pressure to another side of said first elastic membrane and successively displace said first elastic membrane from covering said ports, which results in successively filling of said fluid cells; and
   at least one fluid outlet passage configured to allow fluid to exit from said valve.

2. The valve of claim 1, wherein said first elastic membrane is comprised in a membrane structure.

3. The valve of claim 1, wherein the varying physical property of said first elastic membrane comprises elasticity, resiliency, stiffness, flexibility, stretchability, expandability or any combination thereof.

4. The valve of claim 1, wherein the varying physical property of said elastic first membrane comprises varying width of said depression along a length of said first elastic membrane.

5. The valve of claim 1, wherein the varying physical property of said elastic first membrane comprises varying thickness of said depression along a length of said first elastic membrane.

6. The valve of claim 4, wherein said depression of said first elastic membrane comprises a narrowing width from one side to another side thereof.

7. The valve of claim 5, wherein said depression of said first elastic membrane comprises notches.

8. The valve of claim 5, wherein said depression of said first elastic membrane forms a slope deepening from one side to another side thereof.

9. The valve of claim 1, wherein said depression of said first elastic membrane comprises two or more compartment sections of varying sizes.

10. The valve of claim 1, further comprising a second elastic membrane having at least one physical property different from the first elastic membrane, wherein each one of said first and second elastic membranes is configured to cover at least one of said ports, to cause varying pressure among said fluid cells when fluid is injected into said fluid cells;
    wherein said at least one membrane fluid inlet is configured to provide fluid so as to apply pressure on one side of each of said first and second elastic membranes thereby causing said first and second elastic membranes to cover and block access to each of said ports; and
    wherein said at least one channel fluid inlet is configured to provide fluid to said fluid outlet channels to apply pressure to the other side of each of said at least two elastic membranes so as to successively displace said at least two elastic membranes from covering said ports, which results in successively filling of said fluid cells.

11. The valve of claim 10, wherein the at least one distinguishing physical property of said first and second elastic membranes comprises elasticity, resiliency, stiffness, flexibility, stretchability, expandability or any combination thereof.

12. The valve of claim 10, wherein the at least one distinguishing physical property of said first and second elastic membranes comprises width, length, thickness or any combination thereof.

\* \* \* \* \*